(12) United States Patent  
Mirhosseini

(10) Patent No.: US 12,450,686 B2  
(45) Date of Patent: Oct. 21, 2025

(54) METHODS AND DEVICES FOR IMPROVED INVERSE ITERATIVE WARPING

(71) Applicant: Apple Inc., Cupertino, CA (US)

(72) Inventor: Seyedkoosha Mirhosseini, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/664,159

(22) Filed: May 14, 2024

(65) Prior Publication Data

US 2024/0303766 A1    Sep. 12, 2024

Related U.S. Application Data

(63) Continuation of application No. 16/983,201, filed on Aug. 3, 2020, now Pat. No. 12,014,472.

(60) Provisional application No. 62/895,062, filed on Sep. 3, 2019.

(51) Int. Cl.
```
G06T 3/18        (2024.01)
G06T 19/20       (2011.01)
```
(52) U.S. Cl.
CPC ............. G06T 3/18 (2024.01); G06T 19/20 (2013.01); *G06T 2219/2021* (2013.01)

(58) Field of Classification Search
CPC .... G06T 3/18; G06T 19/20; G06T 2219/2021
See application file for complete search history.

(56) References Cited

U.S. PATENT DOCUMENTS

| | | | |
|---|---|---|---|
| 5,594,676 A | 1/1997 | Greggain et al. | |
| 8,624,891 B2 | 1/2014 | Bowles et al. | |
| 2004/0228530 A1* | 11/2004 | Schwartz | G06T 7/11 382/173 |
| 2004/0252230 A1 | 12/2004 | Winder | |
| 2004/0252759 A1 | 12/2004 | John Winder et al. | |
| 2005/0174346 A1* | 8/2005 | Park | G06T 15/04 345/422 |
| 2011/0234756 A1 | 9/2011 | Adler et al. | |

(Continued)

OTHER PUBLICATIONS

Sungkil Lee et al., "Iterative Depth Warping", ACM Transactions on Graphics (TOG) 37.5 (2018): pp. 1-48.

(Continued)

*Primary Examiner* — YuJang Tswei

(74) *Attorney, Agent, or Firm* — Fernando & Partners, LLP

(57) ABSTRACT

In some implementations, a method includes: obtaining a reference image and forward flow information; identifying a neighborhood of pixels corresponding to a pixel within a target image based on the forward flow information; in accordance with a determination that a characterization vector for the neighborhood of pixels satisfies a background condition, generating a warp result for the pixel based on a first warp type; in accordance with a determination that the characterization vector satisfies a foreground condition, generating the warp result for the pixel based on a second warp type; and in accordance with a determination that the characterization vector does not satisfy the foreground or background conditions, generating the warp result for the pixel based on a third warp type; and populating pixel information for the pixel within the target image based on pixel information for a reference pixel within the reference image that corresponds to the warp result.

20 Claims, 27 Drawing Sheets

(56) References Cited

U.S. PATENT DOCUMENTS

| | | | |
|---|---|---|---|
| 2011/0255592 A1 | 10/2011 | Sung et al. | |
| 2012/0026277 A1* | 2/2012 | Malzbender | H04N 7/147 348/E7.083 |
| 2012/0182299 A1 | 7/2012 | Bowles et al. | |
| 2012/0218427 A1* | 8/2012 | Wu | H04N 23/6811 348/208.6 |
| 2015/0043636 A1* | 2/2015 | Jung | H04N 19/59 375/240.12 |
| 2015/0256819 A1 | 9/2015 | Panahpour Tehrani et al. | |
| 2016/0005216 A1 | 1/2016 | Lee et al. | |
| 2017/0243361 A1 | 8/2017 | Schaffert et al. | |
| 2018/0144485 A1* | 5/2018 | Kobayashi | G06T 7/269 |
| 2019/0045193 A1* | 2/2019 | Socek | G06T 5/30 |
| 2019/0066733 A1 | 2/2019 | Somanath et al. | |
| 2019/0139239 A1 | 5/2019 | Yasutomi | |
| 2019/0220965 A1 | 7/2019 | Cao et al. | |
| 2020/0286293 A1 | 9/2020 | Jia et al. | |
| 2021/0289189 A1 | 9/2021 | Sela | |
| 2021/0303753 A1 | 9/2021 | Rogowski et al. | |
| 2022/0156321 A1* | 5/2022 | Song | G06F 16/9024 |
| 2022/0303495 A1 | 9/2022 | Choe et al. | |

OTHER PUBLICATIONS

Lei Yang et al., "Accelerating Rendering Pipelines Using Bidirectional Iterative Reprojection", Proceedings of The 39th International Conference and Exhibition on Computer Graphics and Interactive Techniques, 2012, pp. 1-49.

Terrance E. Boult et al., "Correcting Chromatic Aberrations Using Image Warping", In CVPR, 1992, pp. 684-687.

Huw Bowles, "Fixed Point Iteration a.k.a. Science!!!", Game Developers Conference, Mar. 2016, pp. 1-70.

Benjamin T. Cecchetto, "Correction of Chromatic Aberration from a Single Image Using Keypoints", arXiv preprint arXiv:2002.03196, 2020, pp. 1-7.

Huw Bowles et al., "Iterative Image Warping", Eurographics, vol. 31, No. 2, 2012, pp. 1-10.

Leonard Mcmillan, "Image-Based Rendering Using Image Warping", Com-Puter Graphics Proceedings, Annual Conference Sefies, ACM SIG-GRAP, 2009, pp. 1-20.

Lei Yang et al., "Image-Based Bidirectional Scene Reprojection", Proceedings of the 2011 SIGGRAPH Asia Conference, 2011, pp. 1-10.

Robert W. Marcato, Jr., "Optimizing an Inverse Warper", Diss. Massachusetts Institute of Technology, 1998, pp. 1-51.

Leonard Mcmillan, Jr., "An Image-Based Approach to Three-Dimensional Computer Graphics", Diss. University of North Carolina, 1997, pp. 1-206.

S. Pereverzyev et al., "Approximate solution of nonlinear inverse problems by fixed-point iteration", Journal of Physics: Conference Series, vol. 135, No. 1, 2008, pp. 1-13.

Mctoria Rudakova et al., "Precise correction of lateral chromatic aberration in images", PSIVT, Oct. 2013, pp. 12-22.

William R. Mark, "Post-Rendering 3D Image Warping: Visibility, Reconstruction, and Performance for Depth-Image Warping", Diss. University of North Carolina, 1999, pp. 1-227.

Junheum Park et al., "BMBC: Bilateral Motion Estimation with Bilateral Cost Volume for Video Interpolation," Computer Vision—ECCV 2020: 16th European Conference, Glasgow, UK, Aug. 23-28, 2020, Proceedings, Part XIV 16. Springer International Publishing, 2020.

* cited by examiner

Forward Warping 600

Source Image 610 -> f(x,y)    Target Image 620 -> g(x',y')

T(x,y) 630

Coordinate system 612    Coordinate system 622

Inverse Warping 650

Source Image 610 -> f(x,y)    Target Image 620 -> g(x',y')

T⁻¹(x,y) 660

Coordinate system 612    Coordinate system 622

METHODS AND DEVICES FOR IMPROVED INVERSE ITERATIVE WARPING

RELATED APPLICATION

This application is a continuation of U.S. patent application Ser. No. 16/983,201, filed on Aug. 3, 2020, which claims priority to U.S. Provisional Patent Application No. 62/895,062, filed on Sep. 3, 2019, both of which are incorporated herein by reference in their entirety.

TECHNICAL FIELD

The present disclosure generally relates to image warping, and in particular, to systems, methods, and devices for inverse iterative warping.

BACKGROUND

In computer graphics rendering, significant coherence is exhibited across frames of moving or animated content (i.e., temporal coherence) and also across nearby views of a scene (i.e., spatial coherence). Current rendering pipelines recompute each frame, resulting in a large amount of repeated work. Current warping methods are able to synthesize plausible interpolated frames therebetween without performing rasterization and shading, by reusing rendering results from neighboring frame(s). As one example, inverse iterative warping may be performed on a reference image to produce the target image. However, the final output of the inverse iterative warping operation is significantly impacted by a starting point chosen within the reference image similar to gradient descent.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
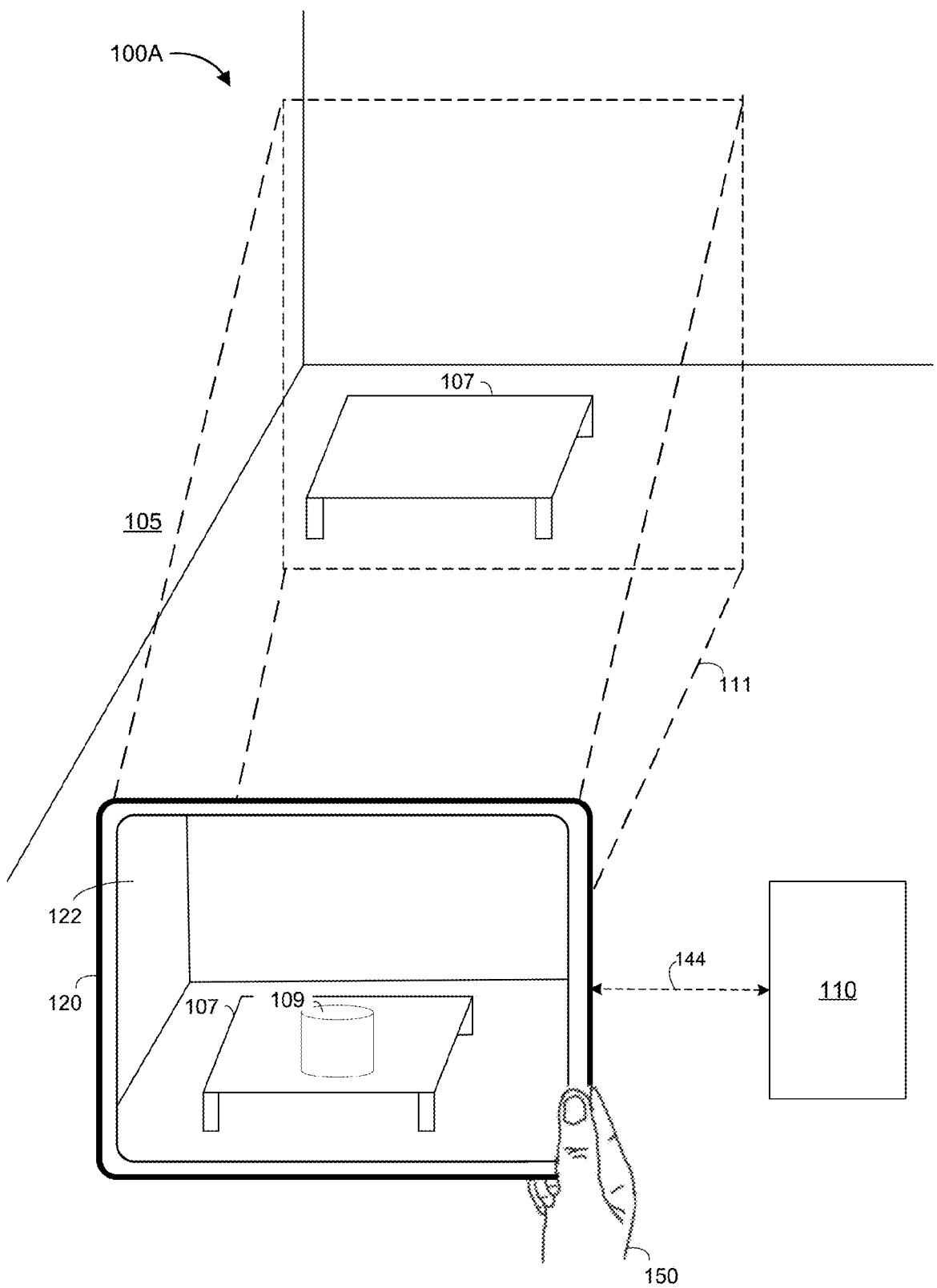
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for inverse iterative warping based on a statistically robust warp (SRW) algorithm. According to some implementations, the method is performed at a device including non-transitory memory and one or more processors coupled with the non-transitory memory. The method includes: obtaining a reference image frame and forward flow information associated with the reference image frame; for a respective pixel within a target image frame, obtaining a plurality of starting points within the reference image frame, wherein each of the plurality of starting points is associated with pixel coordinates within the reference image frame and a different depth value; generating a plurality of intermediate warp results for the respective pixel based on the plurality of starting points within the reference image frame and the forward flow information, wherein each of the plurality of intermediate warp results is associated with a candidate warp position and an associated depth, and wherein each of the plurality of intermediate warp results is generated based on a different one of the plurality of starting points within the reference image frame; selecting a warp result for the respective pixel from among the plurality of intermediate warp results, wherein the warp result corresponds to the candidate warp position associated with a closest depth to a viewpoint associated with the reference image frame; and populating pixel information for the respective pixel within the target image frame based on pixel information for a reference pixel within the reference image frame that corresponds to the warp result.

Various implementations disclosed herein include devices, systems, and methods for inverse iterative warping based on an adaptive statistically robust warp (ASRW) algorithm. According to some implementations, the method is performed at a device including non-transitory memory and one or more processors coupled with the non-transitory memory. The method includes obtaining a reference image frame and forward flow information associated with the reference image frame; obtaining a plurality of characterization vectors for each of a plurality of neighborhoods of pixels in the reference image frame, wherein each characterization vector at least includes a foreground depth value and a background depth value. For a respective pixel within a target image frame, the method also includes: identifying a respective neighborhood of pixels within the reference image frame that corresponds to the respective pixel within the target image frame based on the forward flow information; in accordance with a determination that a respective characterization vector for the respective neighborhood of pixels satisfies a background condition, generating a warp result for the respective pixel based on a first warp type, wherein the warp result includes a warp position and an associated depth value; in accordance with a determination that the respective characterization vector for the respective neighborhood of pixels satisfies a foreground condition, generating the warp result for the respective pixel based on a second warp type; and in accordance with a determination that the respective characterization vector for the respective neighborhood of pixels does not satisfy the foreground or background conditions, generating the warp result for the respective pixel based on a third warp type. The method further includes populating pixel information for the respective pixel within the target image frame based on pixel information for a reference pixel within the reference image frame that corresponds to the warp result.

Various implementations disclosed herein include devices, systems, and methods for performing dissimilar warp resolutions on sub-pixels of a respective pixel for fast chromatic aberration correction (CAC). According to some implementations, the method is performed at a device including non-transitory memory and one or more processors coupled with the non-transitory memory. The method includes: obtaining a reference image frame and forward flow information associated with the reference image frame; for a respective pixel within a target image frame, generating a first warp position and a first depth value for one or more first sub-pixels (e.g., green) corresponding to the respective pixel based at least in part on the forward flow information, wherein the respective pixel includes one or more first sub-pixels associated with a first color, a second sub-pixel associated with a second color, and a third sub-pixel associated with a third color; selecting a color between the second and third colors (e.g., red and blue) associated with the second and third sub-pixels corresponding to the respective pixel; performing a predetermined number of fixed-point iterations from the first warp position for the one or more first sub-pixels in order to generate a second warp position and a second depth value for the selected color associated with the second and third sub-pixels corresponding to the respective pixel; obtaining first sub-pixel information from a first channel of the reference image frame based on the first warp position; obtaining second sub-pixel information from second and third channels of the reference image frame based on the second warp position; and populating pixel information for the respective pixel within the target image frame by combining the first sub-pixel information and the second sub-pixel information from the reference image frame.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an optional controller 110 and an electronic device 120 (e.g., a tablet, mobile phone, laptop, wearable computing device, or the like).

In some implementations, the controller 110 is configured to render video and/or CGR content. In some implementations, the controller 110 is configured to manage and coordinate a CGR experience for a user 150 (sometimes also referred to herein as a "CGR environment"). In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video content to the user 150. In some implementations, the electronic device 120 is configured to present the CGR experience to the user 150. In some implementations, the electronic device 120 includes a suitable combination of software, firmware, and/or hardware. The electronic device 120 is described in greater detail below with respect to FIG. 3.

According to some implementations, the electronic device 120 presents a CGR experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the CGR experience, the electronic device 120 is configured to present CGR content (e.g., a CGR cylinder 109) and to enable video pass-through of the physical environment 105 (e.g., including the table 107) on a display 122. For example, the electronic device 120 corresponds to a mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the CGR content (e.g., the CGR cylinder 109) onto the additive display, which is, in turn, overlaid on the physical environment 105 from the perspective of the user 150. In some implementations, the electronic device 120 presents the user interface by displaying the CGR content (e.g., the CGR cylinder 109) on the additive display, which is, in turn, overlaid on the physical environment 105 from the perspective of the user 150.

Figure 1B:
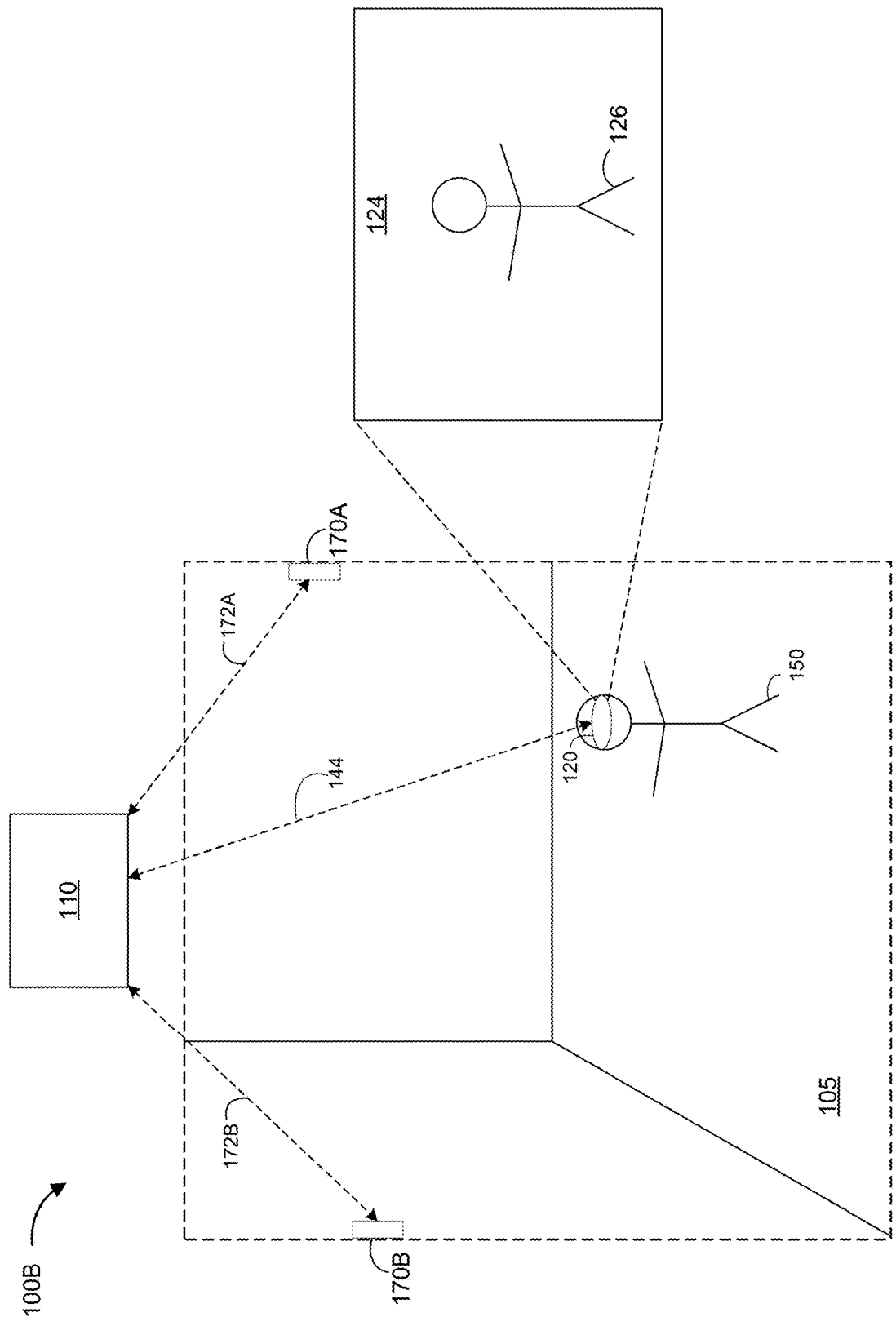
FIG. 1B is a block diagram of another example operating architecture in accordance with some implementations.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100B includes the controller 110, the electronic device 120 (e.g., a head-mounted device (HMD), a wearable computing device, or the like), and optional remote input devices 170A and 170B. While the exemplary operating environment 100B in FIG. 1B includes two remote input devices 170A and 170B, those of ordinary skill in the art will appreciate from the present disclosure that the operating environment of various implementations of present invention may include any number of remote input devices, such as a single remote input device.

In some implementations, the controller 110 is configured to render video and/or CGR content. In some implementations, the controller 110 is configured to manage and coordinate a CGR experience for a user 150 (sometimes also referred to herein as a "CGR environment"). In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the functions of the controller 110 are provided by the electronic device 120. As such, in some implementations, the components of the controller 110 are integrated into the electronic device 120.

In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the controller 110 is communicatively coupled with the remote input devices 170A and 170B via wired or wireless communication channels 172A and 172B (e.g., BLUETOOTH, IEEE 802.11x, IEEE 802.16x, IEEE 802.3x, etc.). In some implementations, the electronic device 120 is communicatively coupled with the remote input devices 170A and 170B via wired or wireless communication channels (e.g., BLUETOOTH, IEEE 802.11x, IEEE 802.16x, IEEE 802.3x, etc.) (not shown).

In some implementations, the electronic device 120 is configured to present the CGR experience 124 to the user 150. In some implementations, the electronic device 120 includes a suitable combination of software, firmware, and/ or hardware. The electronic device 120 is described in greater detail below with respect to FIG. 3. According to some implementations, the electronic device 120 presents the CGR experience 124 to the user 150 while the user 150 is virtually and/or physically present within a physical environment 105. In some implementations, while presenting the CGR experience 124, the electronic device 120 is configured to present CGR content and to enable optical see-through of the physical environment 105. In some implementations, while presenting the CGR experience 124, the electronic device 120 is configured to present CGR content and to optionally enable video pass-through of the physical environment 105.

In some implementations, the electronic device 120 includes one or more displays (e.g., a single display or one for each eye). In such implementations, the electronic device 120 presents the CGR experience 124 by displaying data corresponding to the CGR experience 124 on the one or more displays or by projecting data corresponding to the CGR experience 124 onto the retinas of the user 150.

In some implementations, the user 150 wears the electronic device 120 on his/her head such as an HMD. As such, the electronic device 120 includes one or more displays provided to display the CGR content. For example, the electronic device 120 encloses the field-of-view of the user 150. In some implementations, the electronic device 120 includes an integrated display (e.g., a built-in display) that displays the CGR experience 124. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the CGR experience 124. In some implementations, the electronic device 120 is replaced with a CGR chamber, enclosure, or room configured to present CGR content in which the user 150 does not wear the electronic device 120. In the example of FIG. 1B, the CGR experience 124 (e.g., a CGR environment) includes a CGR representation 126 of the user 150 (e.g., a user avatar). In some implementations, the controller 110 and/or the electronic device 120 cause the CGR representation 126 to move based on movement information (e.g., body pose data) from the electronic device 120 and/or the remote input devices 170A and 170B.

In some implementations, the optional remote input devices 170A and 170B correspond to fixed or movable sensory equipment within the physical environment 105 (e.g., image sensors, depth sensors, infrared (IR) sensors, event cameras, microphones, etc.). In some implementations, each of the remote input devices 170A and 170B is configured to collect/capture input data and provide the input data to the controller 110 and/or the electronic device 120 while the user 150 is physically within the physical environment 105. In some implementations, the remote input devices 170A and 170B include microphones, and the input data includes audio data associated with the user 150 (e.g., speech samples). In some implementations, the remote input devices 170A and 170B include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices 170A and 170B include feedback devices such as speakers, lights, or the like.

Figure 2:
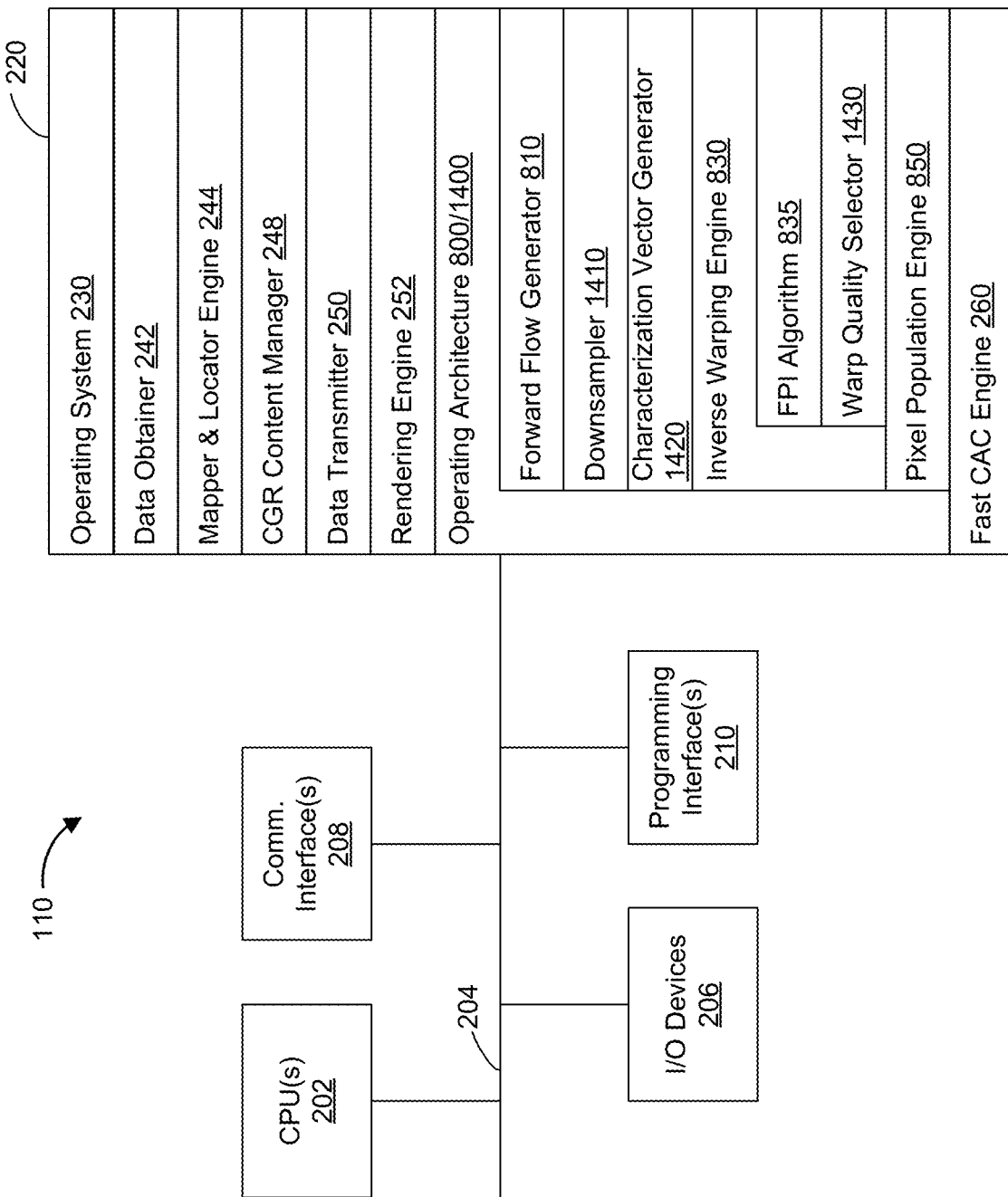
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a data obtainer 242, a mapper and locator engine 244, a CGR content manager 248, a data transmitter 250, a rendering engine 252, an operating architecture 800/1400, and a fast chromatic aberration correction (CAC) engine 260.

The operating system 230 includes procedures for handling various basic system services and for performing hardware dependent tasks.

In some implementations, the data obtainer 242 is configured to obtain data (e.g., presentation data, user interaction data, sensor data, location data, movement information, depth information, auxiliary depth information, etc.) from at least one of the I/O devices 206 of the controller 110, the electronic device 120, and the optional remote input devices 170A and 170B. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. In some implementations, the mapper and locator engine 244 is configured to generate depth information, auxiliary depth information, eye tracking information, body pose tracking information, movement tracking information, and/or the like based on the data obtained from at least one of the I/O devices 206 of the controller 110, the electronic device 120, and the optional remote input devices 170A and 170B. To that end, in various implementations, the mapper and locator engine 244 includes instructions and/or logic therefor, and heuristics and metadata therefor.

In some implementations, the CGR content manager 248 is configured to manage and modify a CGR environment presented to a user. To that end, in various implementations, the CGR content manager 248 includes instructions and/or logic therefor, and heuristics and metadata therefor.

In some implementations, the data transmitter 250 is configured to transmit data (e.g., presentation data, location data, etc.) to at least the electronic device 120. To that end, in various implementations, the data transmitter 250 includes instructions and/or logic therefor, and heuristics and metadata therefor.

In some implementations, the rendering engine 252 is configured to render reference image frames (e.g., the one or more reference image frames 842 in FIGS. 8 and 14) associated with a 3D modeling/rendering environment or the CGR experience and to generate depth information associated therewith. To that end, in various implementations, the rendering engine 252 includes instructions and/or logic therefor, and heuristics and metadata therefor.

In some implementations, the operating architecture 800/1400 includes a forward flow generator 810, a downsampler 1410, a characterization vector generator 1420, an inverse warping engine 830, and a pixel population engine 850. The operating architecture 800 is described in more detail below with reference to FIG. 8. The operating architecture 1400 is described in more detail below with reference to FIG. 14.

Figure 8:
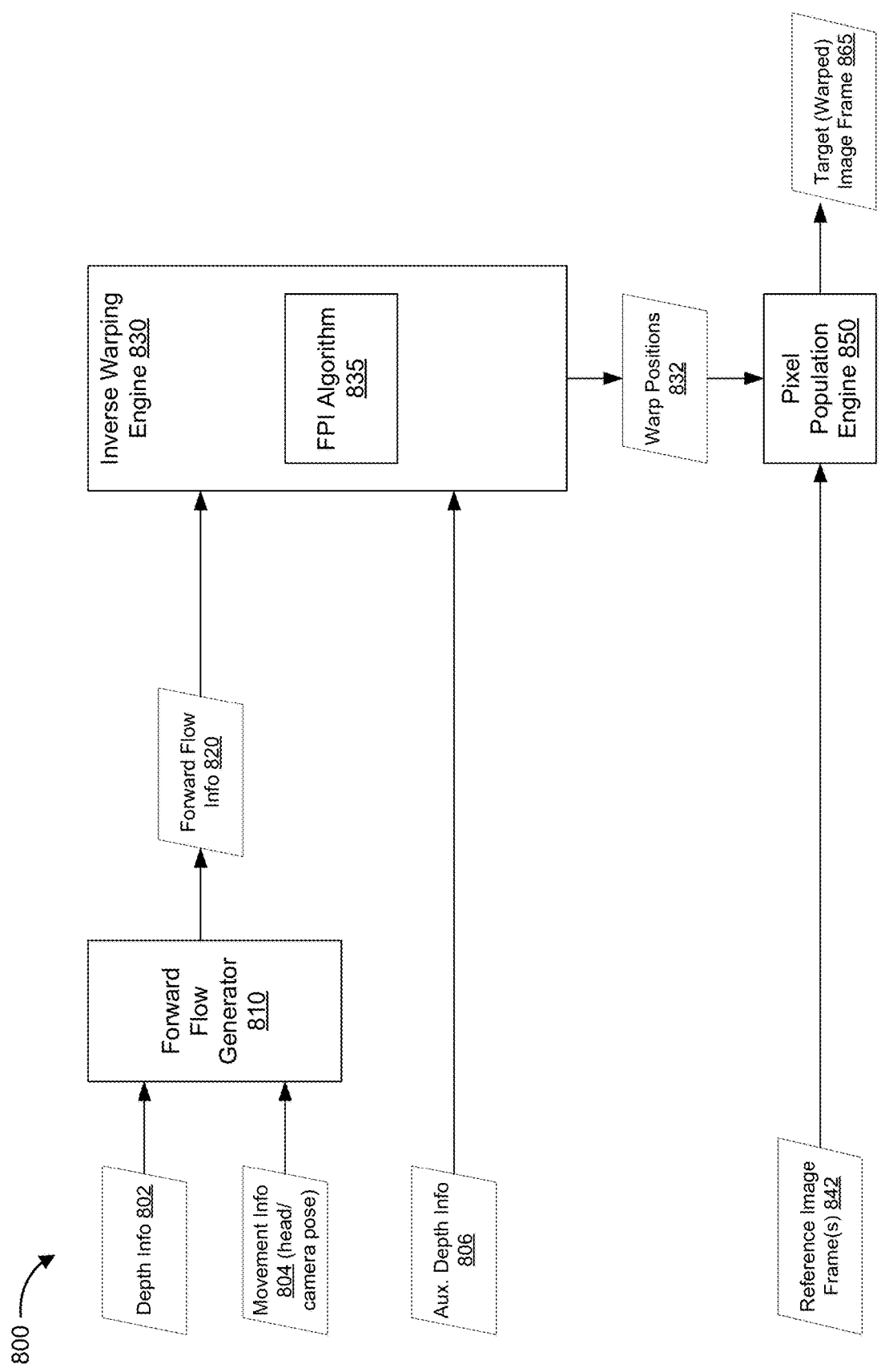
FIG. 8 is a block diagram of an example data processing architecture associated with a statistically robust warp (SRW) algorithm in accordance with some implementations.
Figure 14:
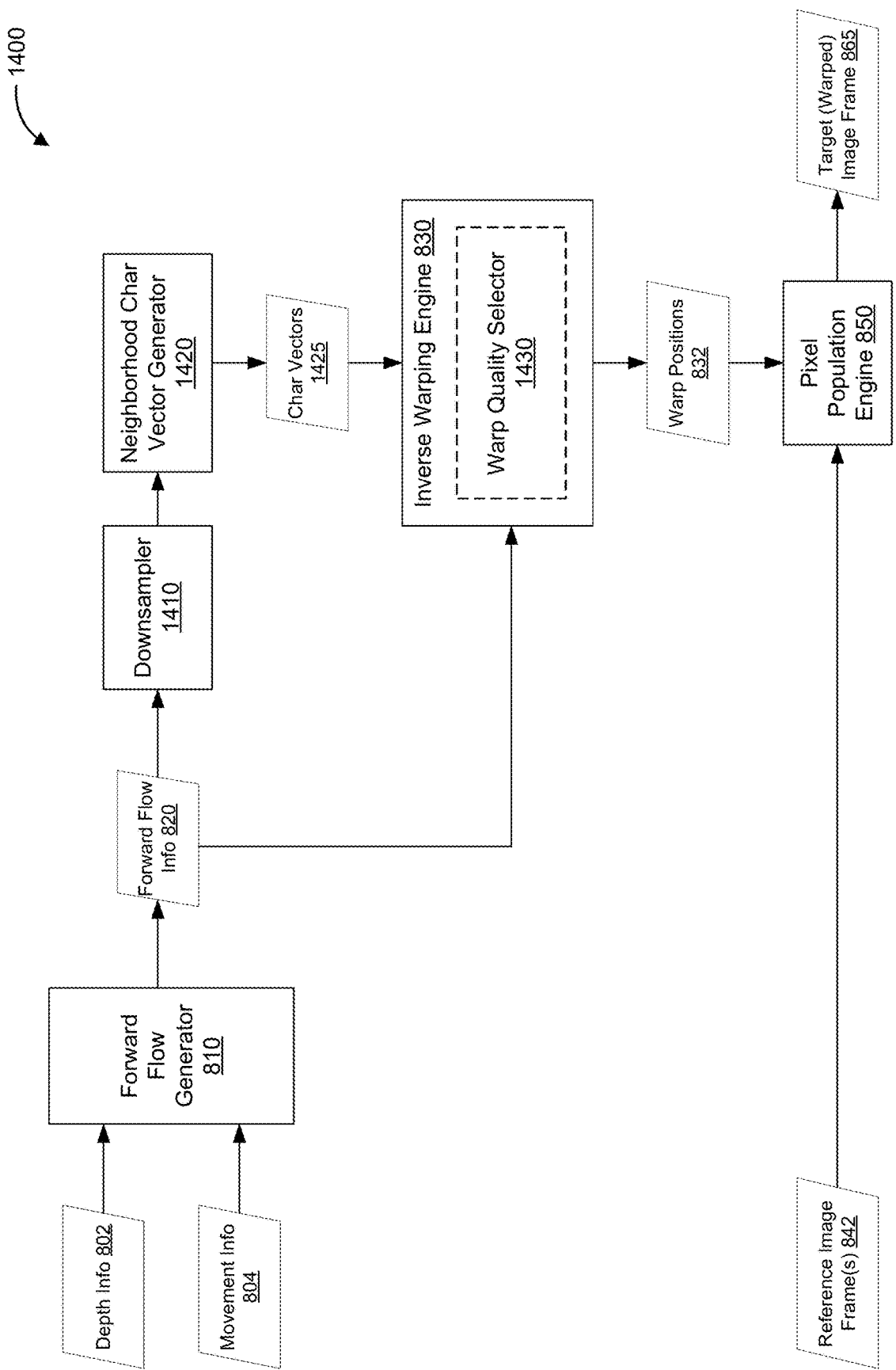
FIG. 14 is a block diagram of an example data processing architecture associated with an adaptive statistically robust warp (ASRW) algorithm in accordance with some implementations.

In some implementations, as described in FIGS. 8 and 14, the forward flow generator 810 is configured to generate forward flow information based on depth information and movement information. To that end, in various implementations, the forward flow generator 810 includes instructions and/or logic therefor, and heuristics and metadata therefor.

In some implementations, as described in FIG. 14, the downsampler 1410 is configured to downsample the forward flow information 1410 in order to determine a dominant movement vector for each A×B pixel neighborhood within the one or more reference image frames. To that end, in various implementations, the downsampler 1410 includes instructions and/or logic therefor, and heuristics and metadata therefor.

In some implementations, as described in FIG. 14, the characterization vector generator 1420 is configured to generate characterization vectors for each A×B pixel neighborhood within the one or more reference image frames. According to some implementations, a respective characterization vector among the characterization vectors for a respective neighborhood includes a dominant movement direction for the respective neighborhood, a background depth value for the respective neighborhood, a foreground depth value for the respective neighborhood, and/or the like. To that end, in various implementations, the characterization vector generator 1420 includes instructions and/or logic therefor, and heuristics and metadata therefor.

In some implementations, as described in FIGS. 8 and 14, the inverse warping engine 830 is configured to generate warp positions for each of a plurality of pixels in a target (warped) image frame. In some implementations, the inverse warping engine 830 includes a fixed-point iteration (FPI) algorithm 835 and/or a warp quality selector 1430, which are described in more detail below with reference to FIGS. 8 and 14, respectively. To that end, in various implementations, the inverse warping engine 830 includes instructions and/or logic therefor, and heuristics and metadata therefor.

In some implementations, as described in FIGS. 8 and 14, the pixel population engine 850 is configured to populate pixel information for each of the plurality of pixels in the target (warped) image frame by looking up pixel information from the one or more reference images frames based on the warp positions. To that end, in various implementations, the pixel population engine 850 includes instructions and/or logic therefor, and heuristics and metadata therefor.

Figure 22:
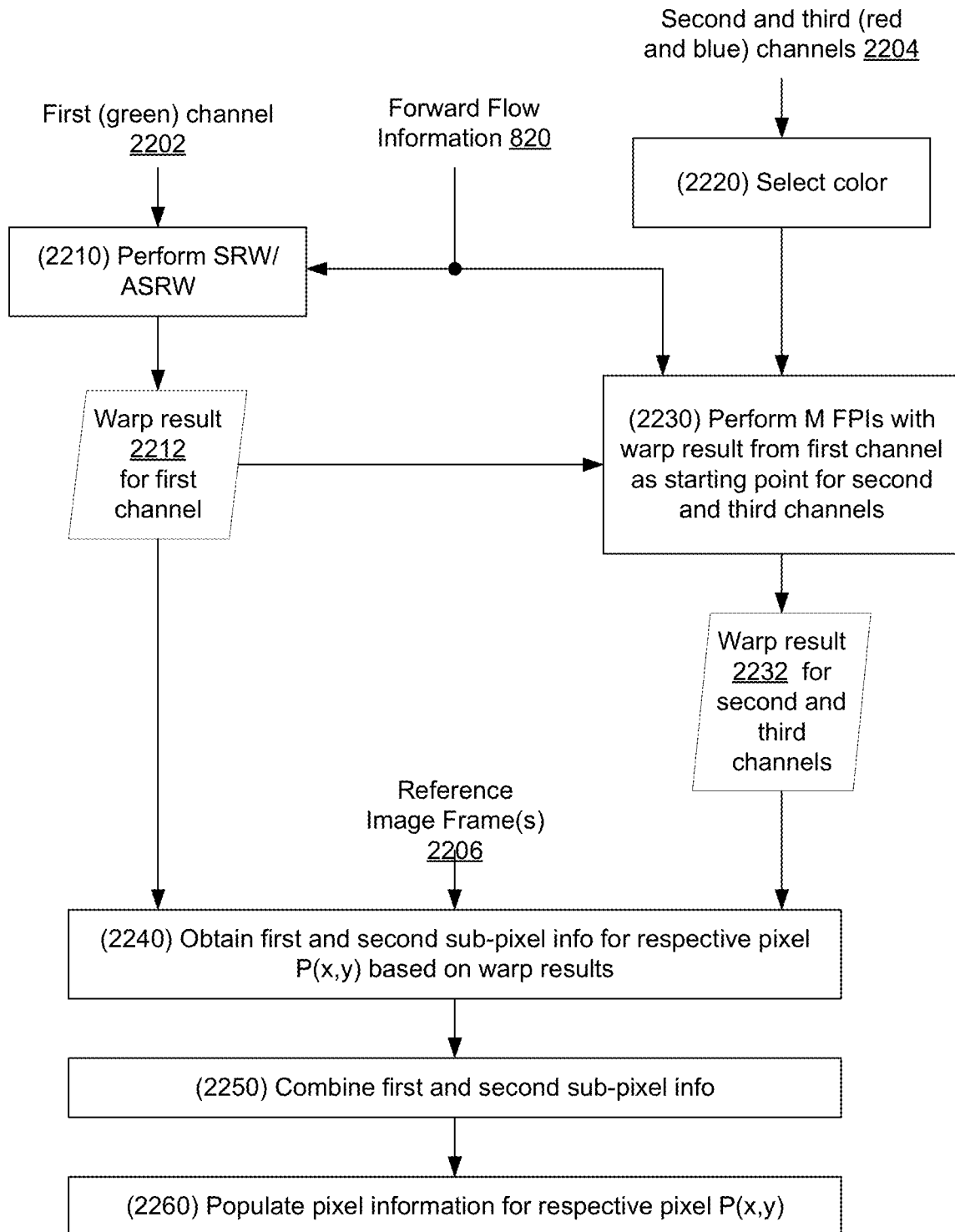
FIG. 22 is a flowchart representation of a process for performing dissimilar warp resolutions for fast chromatic aberration correction (CAC) in accordance with some implementations.

In some implementations, the fast CAC engine 260 is configured to perform a process 2200 described in FIG. 22. In some implementations, the process 2200 includes performing dissimilar warp resolutions on the sub-pixels of a respective pixel type in order to account for chromatic aberration in a faster and more efficient manner. To that end, in various implementations, the fast CAC engine 260 includes instructions and/or logic therefor, and heuristics and metadata therefor.

Although the data obtainer 242, the mapper and locator engine 244, the CGR content manager 248, the data transmitter 250, the rendering engine 252, the operating architecture 800/1400, and the fast CAC engine 260 are shown as residing on a single device (e.g., the controller 110), it should be understood that in other implementations, any combination of the data obtainer 242, the mapper and locator engine 244, the CGR content manager 248, the data transmitter 250, the rendering engine 252, the operating architecture 800/1400, and the fast CAC engine 260 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
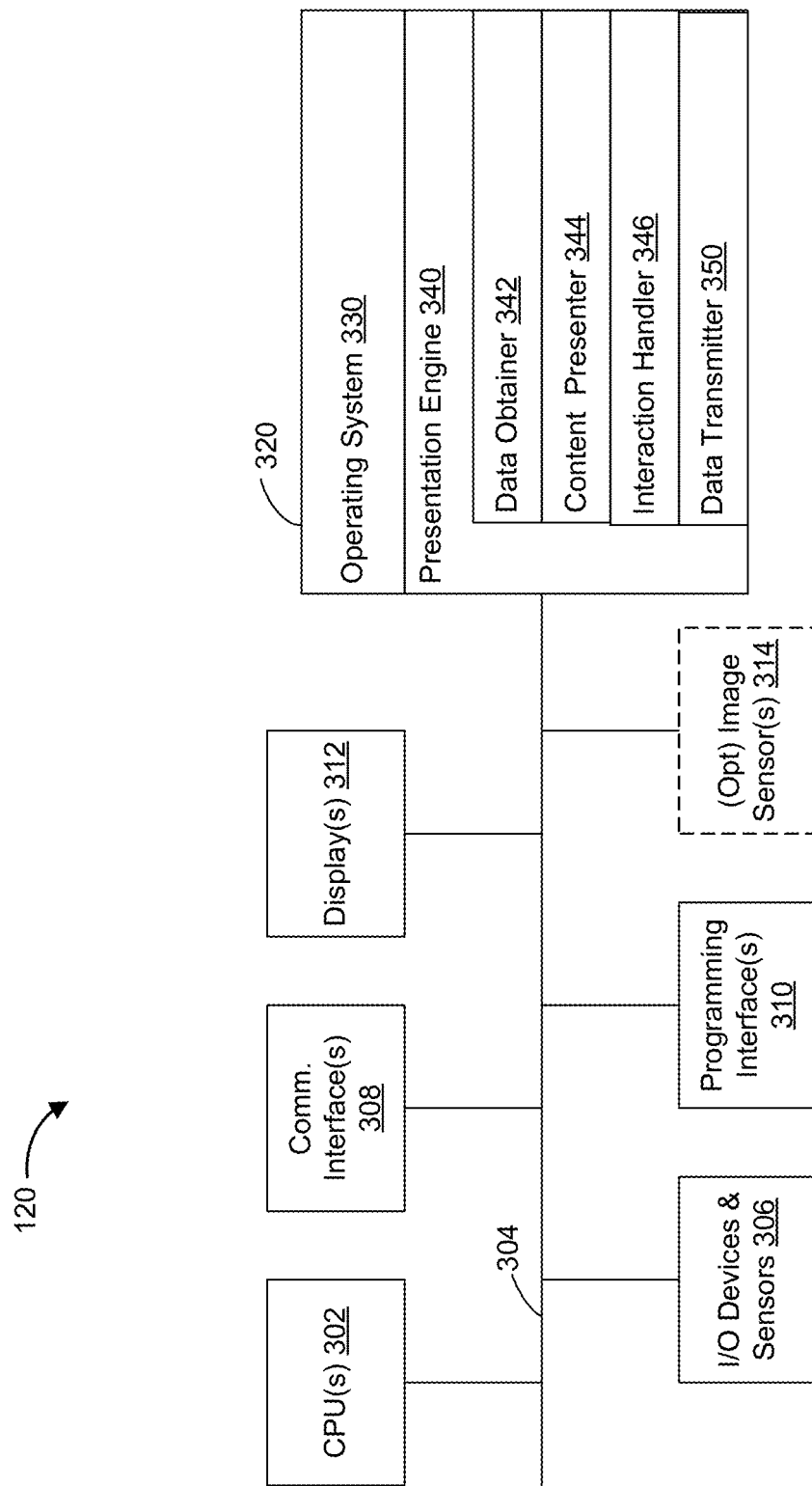
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), a movement tracking engine, a head pose estimator, an eye tracker engine, and/or the like.

In some implementations, the one or more displays 312 are configured to present the CGR experience to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touch-screen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present video and/or CGR content to the user via the one or more displays 312. To that end, in various implementations, the presentation engine 340 includes a data obtainer 342, a content presenter 344, an interaction handler 346, and a data transmitter 350.

In some implementations, the data obtainer 342 is configured to obtain data (e.g., presentation data, user interaction data, sensor data, movement data, head pose data, eye tracking data, location data, etc.) from at least one of the I/O devices and sensors 306 of the electronic device 120, the controller 110, and the remote input devices 170A and 170B. To that end, in various implementations, the data obtainer 342 includes instructions and/or logic therefor, and heuristics and metadata therefor.

In some implementations, the content presenter 344 is configured to present and update content via the one or more displays 312. To that end, in various implementations, the content presenter 344 includes instructions and/or logic therefor, and heuristics and metadata therefor.

In some implementations, the interaction handler 346 is configured to detect and interpret user interactions with the presented content. To that end, in various implementations, the interaction handler 346 includes instructions and/or logic therefor, and heuristics and metadata therefor.

In some implementations, the data transmitter 350 is configured to transmit data (e.g., presentation data, user interaction data, sensor data, movement data, head pose data, eye tracking data, location data, etc.) to at least the controller 110. To that end, in various implementations, the data transmitter 350 includes instructions and/or logic therefor, and heuristics and metadata therefor.

Although the data obtainer 342, the content presenter 344, the interaction handler 346, and the data transmitter 350 are shown as residing on a single device (e.g., the electronic device 120), it should be understood that in other implementations, any combination of the data obtainer 342, the content presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
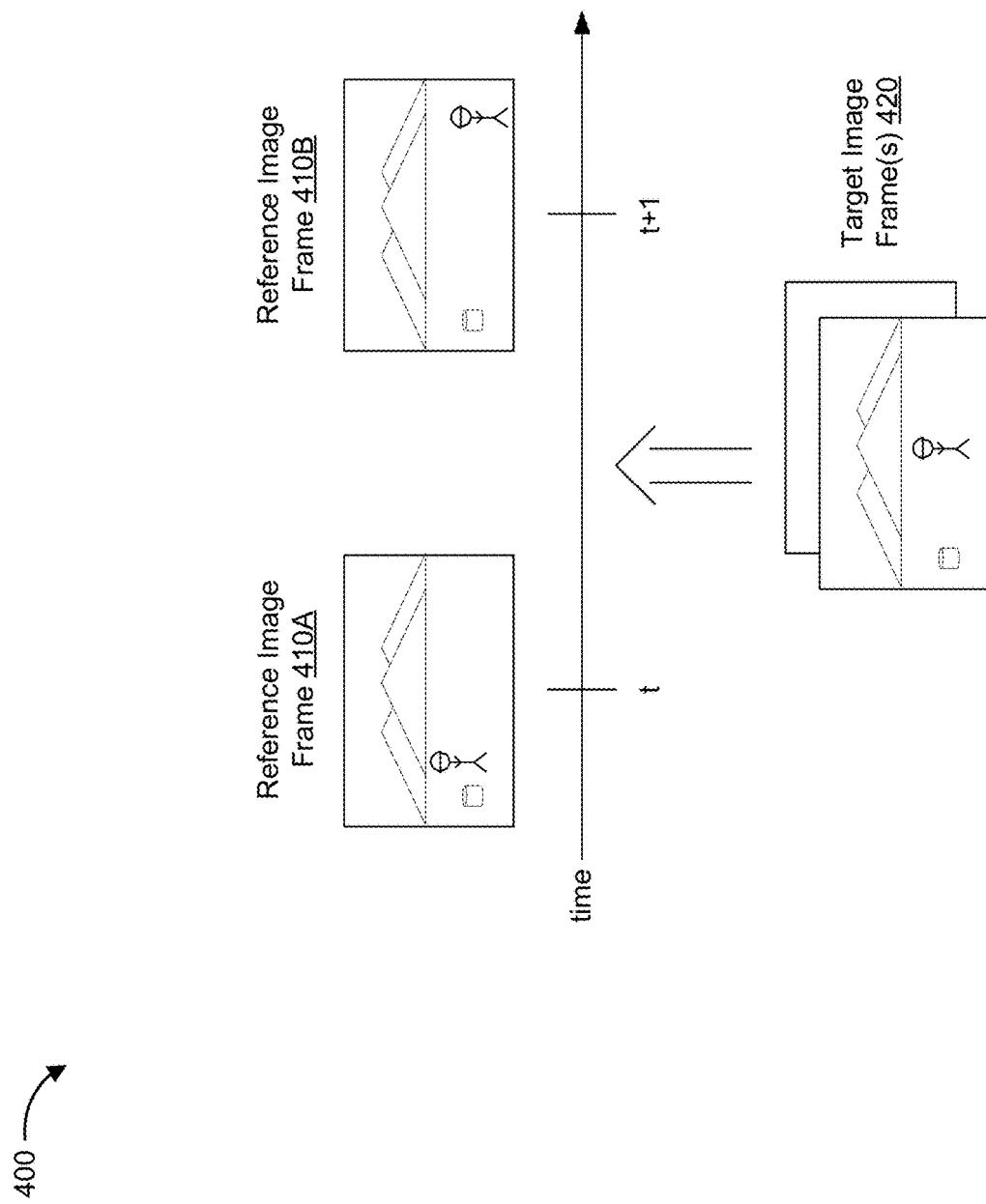
FIG. 4 illustrates a temporal sequence of image frames in accordance with some implementations.

FIG. 4 illustrates a temporal sequence of image frames 400 in accordance with some implementations. For example, reference images frames 410A and 410B (associated with times t and t+1, respectively) are rendered by the controller 110, the electronic device 120, or a suitable combination thereof. According to some implementations, one or more target image frames 420 are synthesized by the controller 110, the electronic device 120, or a suitable combination thereof based on the reference images frames 410A and 410B and a motion vector field associated therewith. As will be understood by one of ordinary skill in the art the reference images frames 410A and 410B exhibit temporal and spatial coherence that can be exploited by inserting the one or more target image frames 420 between times t and t+1.

Figure 5:
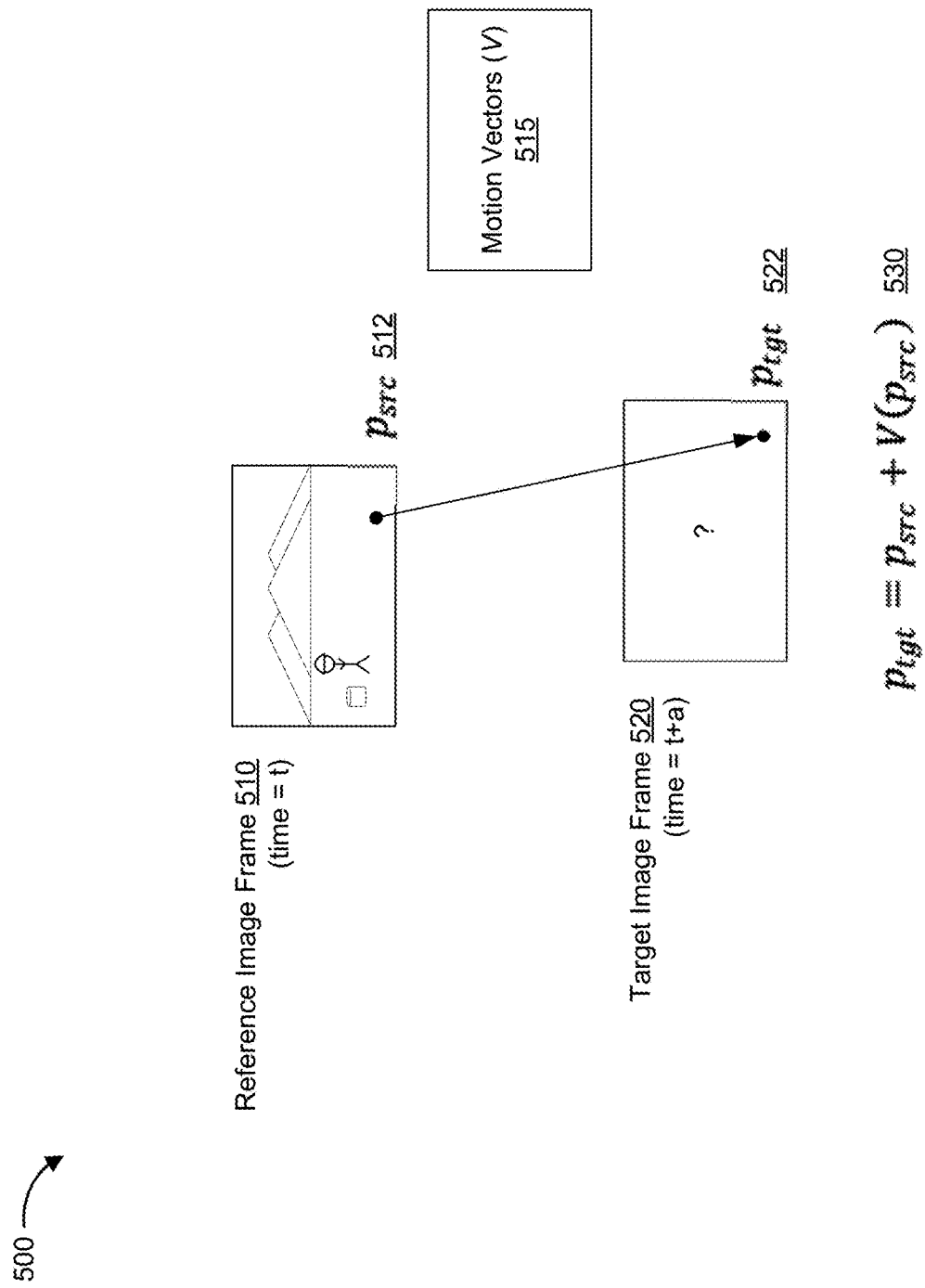
FIG. 5 illustrates a pixel warping relationship in accordance with some implementations.

FIG. 5 illustrates a pixel warping relationship 500 in accordance with some implementations. As shown in FIG. 5, a reference image frame 510 includes a source pixel 512 ($p_{src}$), where the reference image frame 510 corresponds to a time t. As will be understood by one of ordinary skill in the art, a motion vectors map/mask (V) 515 corresponds to: (A) movement of a viewpoint across time and/or space; and/or (B) movement of objects within a scene relative to the viewpoint across time and/or space. As one example, the motion vectors map/mask (V) 515 correspond to a vector field.

As shown in FIG. 5, a target image frame 520 includes a target pixel 522 ($p_{tgt}$), where the target image frame 520 corresponds to a time t+a. According to some implementations, the target image frame 520 may be derived based on the reference image frame 510 and the motion vectors map/mask (V) 515. Furthermore, the target pixel 522 ($p_{tgt}$) within the target image frame 520 is derived according to equation (1) below.

$$p_{tgt} = p_{src} + V(p_{src}) \qquad (1)$$

Figure 6:
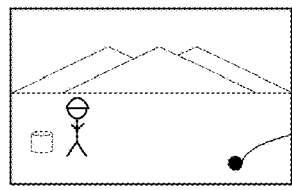
FIG. 6 illustrates forward inverse warping operations in accordance with some implementations.
Figure 6:
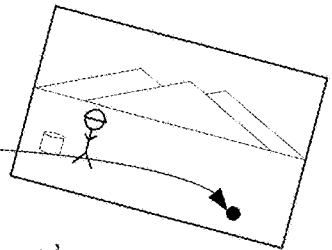
Figure 6:
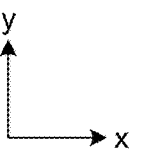
Figure 6:
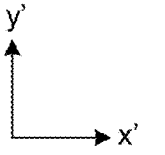
Figure 6:
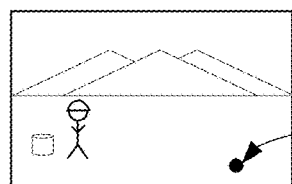
Figure 6:
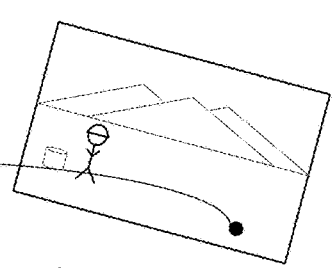
Figure 6:
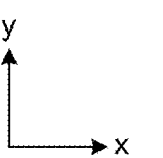
Figure 6:
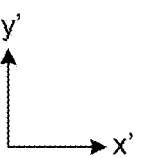

FIG. 6 illustrates a forward warping operation 600 and an inverse warping operation 650 in accordance with some implementations. As will be appreciated by one of ordinary skill in the art, the goal of both the forward warping operation 600 and the inverse warping operation 650 is to warp a source image 610 ($I_S$) representing a rendered view of a scene to a target image 620 ($I_W$) that resembles the scene from a different viewpoint in time and/or space.

As shown in FIG. 6, the source image 610 (e.g., a reference rendered image frame) corresponds to a function f(x, y) and is associated with a first coordinate system 612. Furthermore, as shown in FIG. 6, the target image 620 (e.g., a transformed or warped image frame) corresponds to a function g(x', y') and is associated with a second coordinate system 622.

According to some implementations, the forward warping operation 600 sends each pixel f(x, y) in the source image 610 to its corresponding location (x', y') in the target image 620 based on a transformation T(x, y) 630 that maps the pixels associated with f(x, y) from the first coordinate system 612 to the second coordinate system 622. In other words, the forward warping operation 600 scatters information for the source image into the target image. However, the forward warping operation 600 often causes empty pixels (or holes) in the target image 620.

According to some implementations, the inverse warping operation 650 obtains each pixel g(x', y') in the target image 620 from its corresponding location (x, y) in the source image 610 based on a transformation $T^{-1}(x,y)$ 660 that maps the pixels associated with g(x',y') from the second coordinate system 622 to the first coordinate system 612. In other words, the inverse warping operation 650 reverses the data access pattern as compared to the forward warping operation 600 and gathers information from the source image 610 to fill the target image 620.

Figure 7:
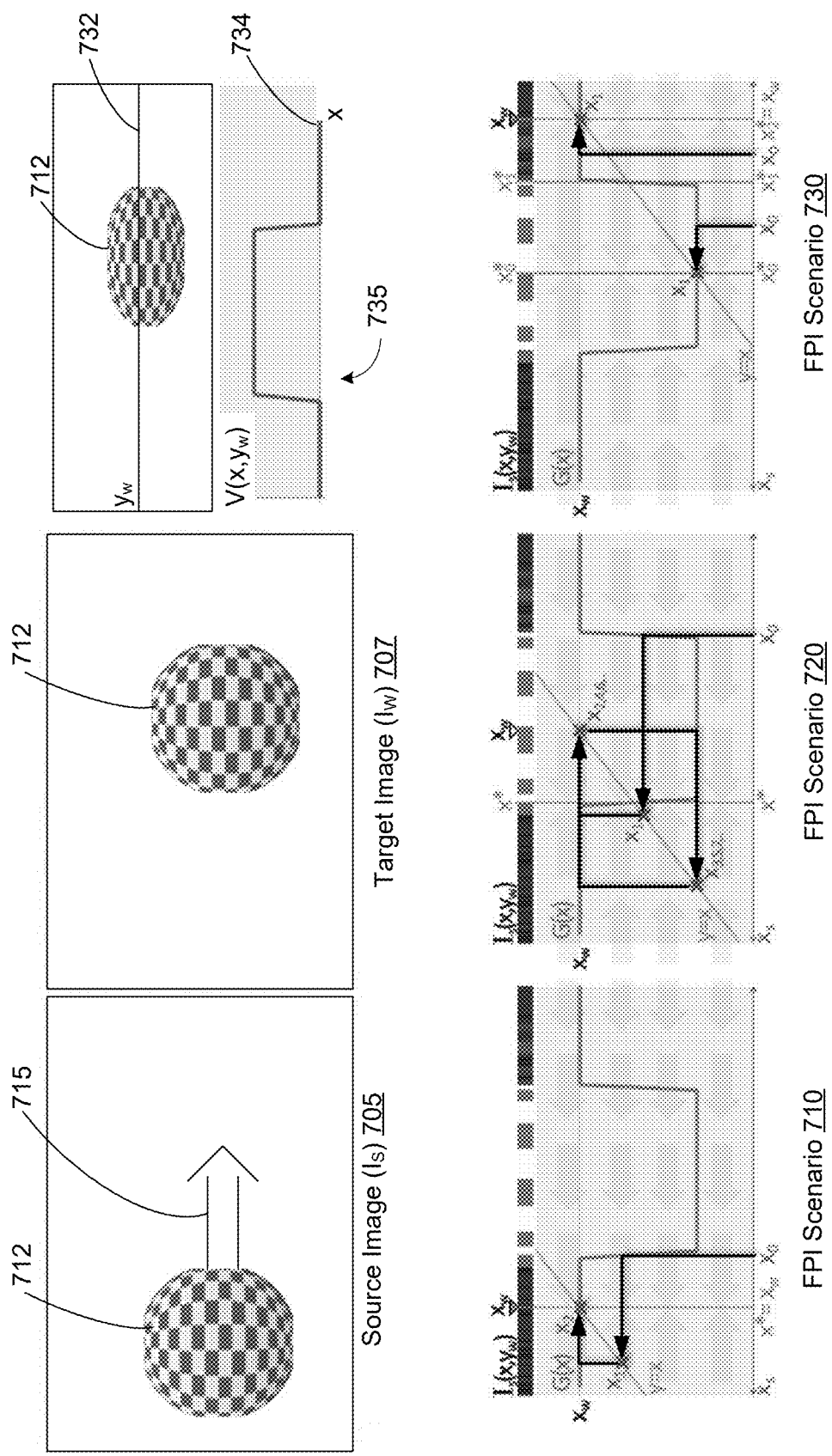
FIG. 7 illustrates various fixed-point iteration (FPI) scenarios in accordance with some implementations.

FIG. 7 illustrates various fixed-point iteration (FPI) scenarios 710, 720, and 730 associated with inverse warping operations in accordance with some implementations. The goal of the inverse warping operations discussed below with reference to FIG. 7 is to warp a source image 705 ($I_S$) representing a rendered view of a scene to a target image 707 ($I_W$) that resembles the scene from a different viewpoint in space and/or time. As shown in FIG. 7, a sphere 712 in the source image 705 ($I_S$) is translated horizontally across a stationary background according to a movement direction 715.

According to some implementations, a warp may be defined as a vector field V: $\mathbb{R}^2 \to \mathbb{R}^2$ that describes how each point in the source image 705 ($I_S$) should be translated in order to produce the target image 707 ($I_W$). For a particular point $x_S$ in the source image 705 ($I_S$), the warped image coordinates $x_W$ are given by the following equation (2), which is similar to equation (1) above.

$$x_W = x_S + V(x_S) \qquad (2)$$

with $x_S, x_W \in \mathbb{R}^2$. In other words, for a particular pixel at point $x_W$ in the target image 707 ($I_W$), the inverse warping operation attempts to find the location(s) $x_S$ in the source image 705 ($I_S$) that satisfy equation (2). FPI may be used to converge to the solution in a fast and efficient manner.

For convenience of explanation, a new function G: $\mathbb{R}^2 \to \mathbb{R}^2$ is defined as $$G(x_S) = x_W - V(x_S). \qquad (3)$$

with reference to the application of FPI to inverse warping. And, as a result, equation (2) can be rewritten as $$G(x_S) = x_S. \qquad (4)$$

The value $x_S = x^*$ that satisfies equation (4) corresponds to a fixed-point of G, where the result of G evaluated on $x^*$ is $x^*$. FPI solves equations of this form by generating a set of iteration points (iterates) $x_i$ using the recurrence relation:

$$x_{i+1} = G(x_i). \qquad (5)$$

Seeded with an initial value $x_0$, the FPI operation computes successive iterates $x_i$ through repeated application of G. As shown by illustration 735, the focus is limited to one dimension by considering a single horizontal slice 732 of the motion vectors taken across the sphere 712 at $y=y_W$. Therefore, the horizontal component of the warp field V (e.g., plotted as V(x, $y_W$) 734 in FIG. 7) is considered for the FPI scenarios 710, 720, and 730.

With reference to the FPI scenarios 710, 720, and 730, the solution points are labeled as $x^*_i$ and lie at the intersection between the line y=x and G(x), otherwise known as the fixed-points of G. The trajectories of the iteration are shown as cobwebs plots, where the iterates are labeled $x_i$ and the process of evaluating G on the current iterate $x_i$ to yield a next iterate $x_{i+1}$, as noted in equation (5), is visually represented by the iteration arrows moving vertically to touch the curve G (representing an evaluation of $G(x_i)$) and then moving horizontally to the line y=x (representing the assignment of G ($x_i$) to the next iterate $x_{i+1}$).

As one example, the FPI scenario 710 includes a single solution corresponding to the intersection between y=x and G. In the FPI scenario 710, the iteration is attracted towards the solution x* and converges to x* regardless of the starting point $x_0$.

As another example, the FPI scenario 720 includes no solutions because the slope of G around x* repels the iteration away to a surrounding orbit associated with an infinite loop. For example, this steep slope corresponds to interpolation across the discontinuity in motion at the left-hand edge of the sphere 712 at which a disocclusion occurs.

As yet another example, the FPI scenario 730 includes three solution points labeled as $x^*_0$, $x^*_1$, and $x^*_2$ corresponding to the intersections between y=x and G. As such, for the FPI scenario 730, the solution obtained from the iteration depends on the starting point $x_0$.

FIG. 8 is a block diagram of an example data processing architecture 800 associated with a statistically robust warp (SRW) algorithm in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the data processing architecture 800 is located within the controller 110 in FIGS. 1A, 1B, and 2; the electronic device 120 in FIGS. 1A, 1B, and 3; or a suitable combination thereof.

According to some implementations, the data processing architecture 800 is configured to generate a target (warped) image frame 865 according to a statistically robust warp (SRW) algorithm. To that end, as a non-limiting example, in some implementations, the data processing architecture 800 includes a forward flow generator 810, an inverse warping engine 830, and a pixel population engine 850.

In some implementations, the forward flow generator 810 is configured to generate forward flow information 820 based on depth information 802 and movement information 804. For example, the depth information 802 corresponds to a depth mesh generated based on depth data associated with a physical environment or a 3D modeling/rendering environment. For example, the movement information 804 corresponds to head tracking information, eye tracking information, body pose tracking information, and/or the like. As another example, the movement information 804 corresponds to displacement, velocity, and/or acceleration of a head or camera pose. According to some implementations the forward flow information 820 corresponds to a vector field or the like that characterizes motion across at least the one or more reference image frames 842.

In some implementations, the inverse warping engine 830 is configured to generate warp positions 832 for each of a plurality of pixels in a target (warped) image frame 865 based on the forward flow information 820 and optional auxiliary depth information 806. According to some implementations, the inverse warping engine 830 includes a fixed-point iteration (FPI) algorithm 835 for determining the warp result as on a per-pixel or a per-quad-group basis as described below with reference to FIGS. 9-12. For example, the FPI technique is described in more detail above with reference to FIG. 7. According to some implementations, the auxiliary depth information 806 includes depth information based on the one or more reference image frames 842 such as the closest and furthest depths associated with augmented objects, a bounding boxes associated with augmented objects, and/or the like.

In some implementations, the pixel population engine 850 populates pixel information for each of the plurality of pixels in the target (warped) image frame 865 by looking up pixel information from the one or more reference images frames 842 based on the warp positions 832. For example, the one or more reference image frames 842 correspond to rendered image frames associated with a 3D modeling/rendering environment. For example, the one or more reference image frames 842 correspond to image frames associated with a physical environment captured by an image sensor.

Figure 9:
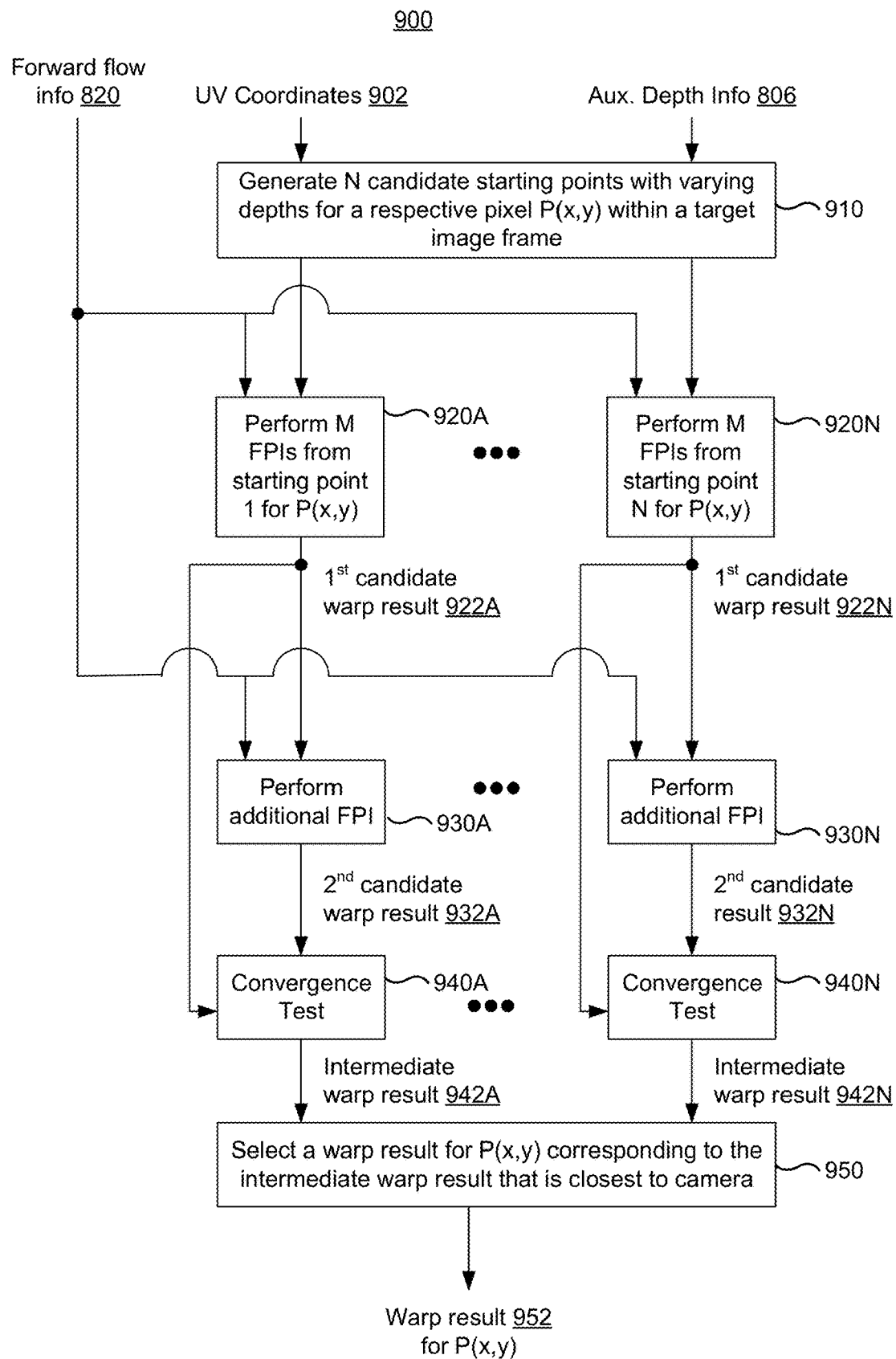
FIG. 9 is a flowchart representation of a process for generating a warp result for a respective pixel in accordance with some implementations.

FIG. 9 is a flowchart representation of a process 900 for generating a warp result for a respective pixel in accordance with some implementations. In various implementations, the process 900 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8). In some implementations, the process 900 is performed by processing logic, including hardware, firmware, software, or a combination thereof. In some implementations, the process 900 is performed by a processor executing code stored in a non-transitory computer-readable medium (e.g., a memory). In various implementations, some operations in the process 900 are, optionally, combined and/or the order of some operations is, optionally, changed.

As represented by block 910, the process 900 includes generating N candidate starting points with varying depths for a respective pixel P(x,y) within a target image frame based on UV coordinates 902 for the respective pixel P(x,y) and the auxiliary depth information 806. According to some implementations, the device determines the UV coordinates 902 in the source image for the respective pixel P(x,y) in the target image based on a distortion mesh. In other words, the device uses the distortion mesh to determine which UV coordinates from the pre-distorted texture should be selected for the respective pixel P(x,y).

Figure 10:
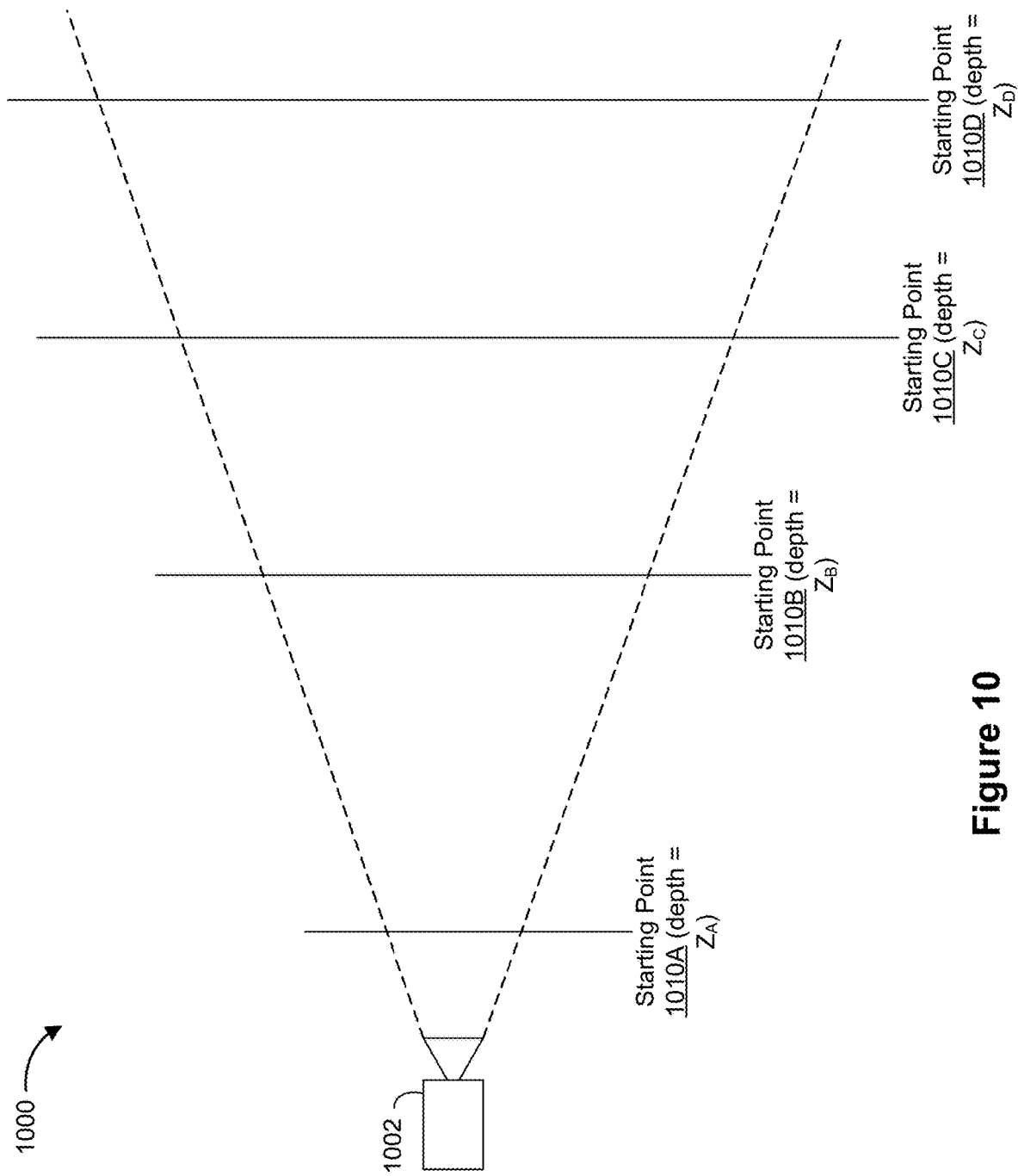
FIG. 10 is an illustration of a depth hierarchy for N candidate starting points in accordance with some implementations.

FIG. 10 is an illustration of a depth hierarchy 1000 for the N candidate starting points in accordance with some implementations. As shown in FIG. 10, assuming that, for example, N=4, the N candidate starting points include: a starting point 1010A with depth $Z_A$ relative to a viewpoint 1002 (e.g., a camera pose/position); a starting point 1010B with depth $Z_B$ relative to the viewpoint 1002; a starting point 1010C with depth $Z_C$ relative to the viewpoint 1002; and a starting point 1010D with depth $Z_D$ relative to the viewpoint 1002, where $Z_A<Z_B<Z_C<Z_D$. In some implementations, the viewpoint 1002 corresponds to a position of a camera, image sensor, or the like relative to the reference image frame.

In some implementations, $Z_A$, $Z_B$, $Z_C$, $Z_D$ correspond to preset depth values such as 10 cm, 50 cm, 3 m, and 10 m, respectively. In some implementations, $Z_A$, $Z_B$, $Z_C$, $Z_D$ are dynamically determined based on the auxiliary depth information 806 such as a depth value for a closest object in a reference image or associated scene, a depth value for a farthest object in the reference image or associated scene, estimated foreground and background depth values, a maximum depth value based on resolution, and/or the like. One of ordinary skill in the art will appreciate that N candidate starting points may selected in myriad manners in various other implementations.

As represented by block 920A, the process 900 includes performing M fixed-point iterations (FPIs) from a first starting point among the N candidate starting points in order to generate a first candidate warp result 922A associated with the first starting point for P(x,y). According to some implementations, the FPI operation(s) are performed based on a reference image and the forward flow information 820 from the selected starting point. For example, the first candidate warp result 922A corresponds to a first warp position and an associated first depth value at t−1. In some implementations, M=1. In some implementations, M≥2. Similarly, as represented by block 920N, the process 900 includes performing M FPIs from an Nth starting point among the N candidate starting points in order to generate a first candidate warp result 922N associated with the Nth starting point for P(x,y). One of ordinary skill in the art will appreciate how to perform the balance of the blocks 920A, . . . , 920N based on the details described above.

As represented by block 930A, the process 900 includes performing an additional FPI using the first candidate warp result 922A as the starting point in order to generate a second candidate warp result 932A associated with the first starting point for P(x,y). For example, the second candidate warp result 932A corresponds to a second warp position and an associated second depth value at t. Similarly, as represented by block 930N, the process 900 includes performing an additional FPI using the first candidate warp result 922N as the starting point in order to generate a second candidate warp result 932N associated with the Nth starting point for P(x,y). One of ordinary skill in the art will appreciate how to perform the balance of the blocks 930A, . . . , 930N based on the details described above.

As represented by block 940A, the process 900 includes performing a convergence test associated with the first starting point for P(x,y) based on the first candidate warp result 922A and the second candidate warp result 932A in order to determine an intermediate warp result 942A associated with the first starting point for P(x,y). The convergence test is described in more detail below with reference to FIG. 11. Similarly, as represented by block 940N, the process 900 includes performing a convergence test associated with the Nth starting point for P(x,y) based on the first candidate warp result 922N and the second candidate warp result 932N in order to determine an intermediate warp result 942N associated with the Nth starting point for P(x,y). One of ordinary skill in the art will appreciate how to perform the balance of the blocks 940A, . . . , 940N based on the details described above.

As represented by block 950, the process 900 includes selecting a warp result 952 for the respective pixel P(x,y) that corresponds to one of the intermediate warp results 942A, . . . , 942N that has a depth value that is closest to the viewpoint 1002 (e.g., a camera pose/position). According to some implementations, the warp result 952 includes a warp position and an associated depth value.

Figure 11:
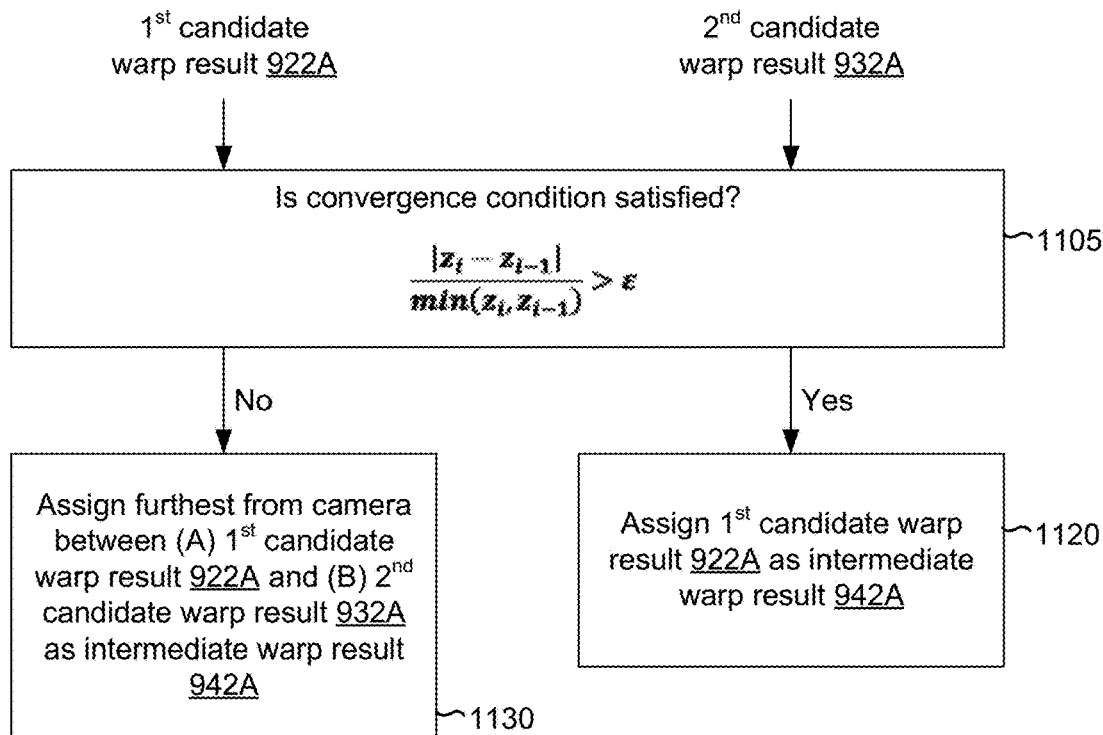
FIG. 11 is flowchart representation of a process for testing convergence of candidates warp results in accordance with some implementations.

FIG. 11 is flowchart representation of a process 1100 for testing convergence of candidates warp results in accordance with some implementations. In various implementations, the process 1100 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8). In some implementations, the process 1100 is performed by processing logic, including hardware, firmware, software, or a combination thereof. In some implementations, the process 1100 is performed by a processor executing code stored in a non-transitory computer-readable medium (e.g., a memory). In various implementations, some operations in the process 1100 are, optionally, combined and/or the order of some operations is, optionally, changed.

For example, the process 1100 corresponds to the block 940A in FIG. 9. Therefore, the process 1100 corresponds to a convergence test associated with the first starting point for P(x,y). However, one of ordinary skill in the art will appreciate how the process 1100 may be repeated for each of the N starting points for P(x,y) such as for the block 940N in FIG. 9.

As represented by block 1105, the process 1100 includes determining whether a convergence condition for the first starting point for P(x,y) is satisfied based on the first candidate warp result 922A and the second candidate warp result 932A. According to some implementations, the convergence condition is represented below as equation (6).

$$\frac{|z_i - z_{i-1}|}{\min(z_i, z_{i-1})} > \varepsilon \tag{6}$$

where ε corresponds to a predetermined constant (e.g., 0.05), $z_{i-1}$ corresponds to the depth value associated with the first candidate warp result 922A, and $z_i$ corresponds to the depth value associated with the second candidate warp result 932A.

If the convergence condition is satisfied ("Yes" branch from block 1105), as represented by block 1120, the process 1100 includes assigning the first candidate warp result 922A as the intermediate warp result 942A associated with the first starting point for P(x,y).

If the convergence condition is not satisfied ("No" branch from block 1105), as represented by block 1130, the process 1100 includes assigning the farthest from the viewpoint 1002 between (A) the first candidate warp result 922A and (B) the second candidate warp result 932A as the intermediate warp result 942A associated with the first starting point for P(x,y). In some implementations, if the convergence condition is not satisfied, a constant is also added to the depth value that corresponds to the intermediate warp result 942A.

Figure 12:
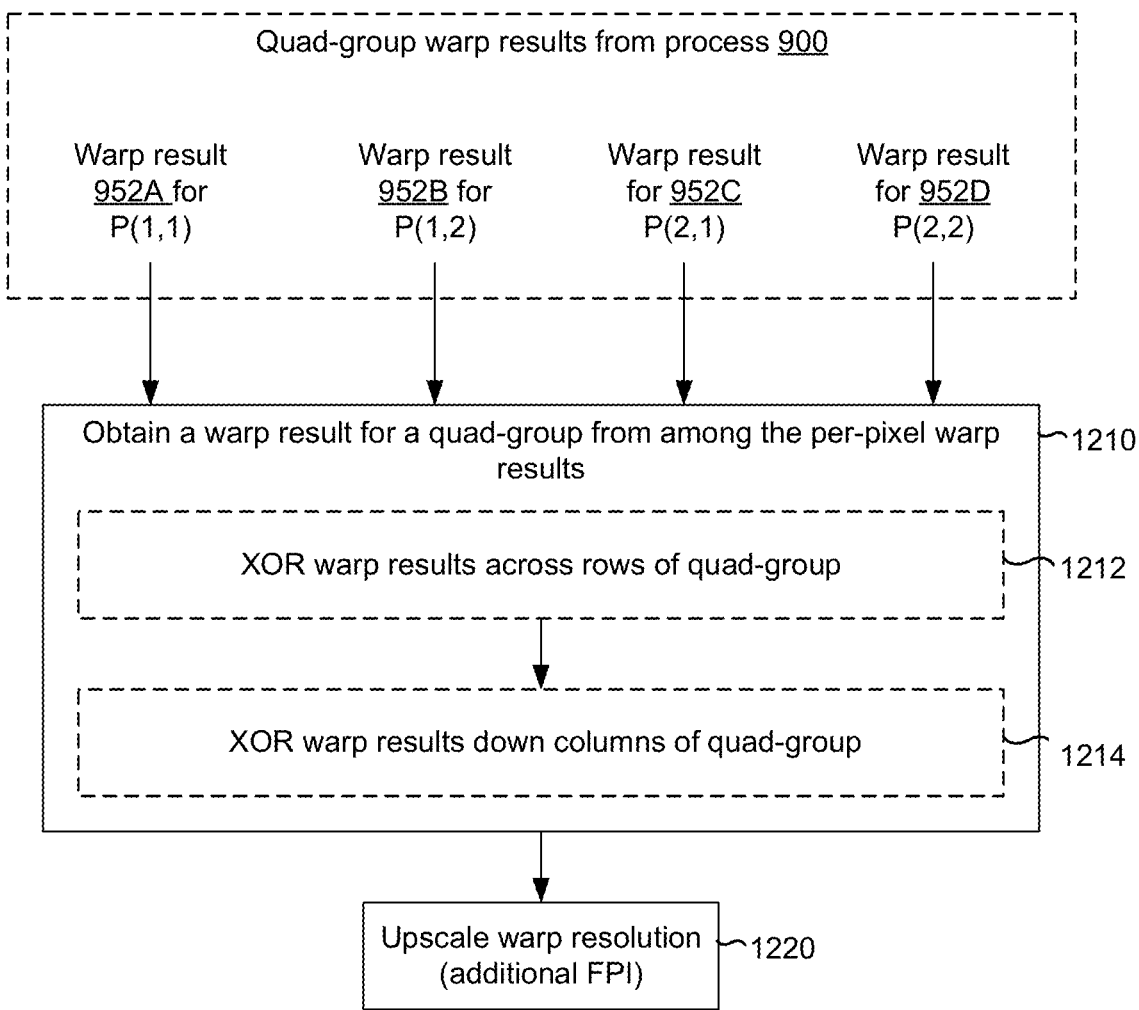
FIG. 12 is a flowchart representation of a process for determining a warp result for a quad-group of pixels in accordance with some implementations.

FIG. 12 is a flowchart representation of a process 1200 for determining a warp result for a quad-group of pixels in accordance with some implementations. In various implementations, the process 1200 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8). In some implementations, the process 1200 is performed by processing logic, including hardware, firmware, software, or a combination thereof. In some implementations, the process 1200 is performed by a processor executing code stored in a non-transitory computer-readable medium (e.g., a memory). In various implementations, some operations in the process 1200 are, optionally, combined and/or the order of some operations is, optionally, changed.

According to some implementations, a target image frame is separated into quad-groups of pixels. For example, a respective quad-group includes pixels P(1,1), P(1,2), P(2,1), and P(2,2). One of ordinary skill in the art will appreciate that the target image frame may be separated into any number of A×B pixel groupings in various other implementations. For example, warp results 952A, 952B, 952C, and 952D for pixels P(1,1), P(1,2), P(2,1), and P(2,2), respectively, are generated based on the process 900 described above with reference to FIG. 9.

As represented by block 1210, the process 1200 includes obtaining a warp result for the respective quad-group from among the per-pixel warp results 952A, 952B, 952C, and 952D that is closest to a viewpoint (e.g., a camera pose/position) associated with the reference image frame. In some implementations, as represented by blocks 1212 and 1214, the warp result for the respective quad-group is optionally obtained by performing a first set of XOR operations across the rows of the respective quad-group (e.g., 952A XOR 952B, and 952C XOR 952D) based on the associated depth values, then performing a second set of one or more XOR operations down the columns of the respective quad-group (e.g., 952A XOR 952C, and 952B XOR 952D) based on the associated depth values to determine the best warp result for the respective quad-group. One of ordinary skill in the art will appreciate that the warp result for the respective quad-group may be obtained as a function of the per-pixel warp results 952A, 952B, 952C, and 952D in myriad other manners in various other implementations.

As represented by block 1220, the process 1200 includes upscaling the warp resolution associated with the warp result from block 1210 by performing an additional FPI operation with the warp result from block 1210 as a starting point.

Figure 13:
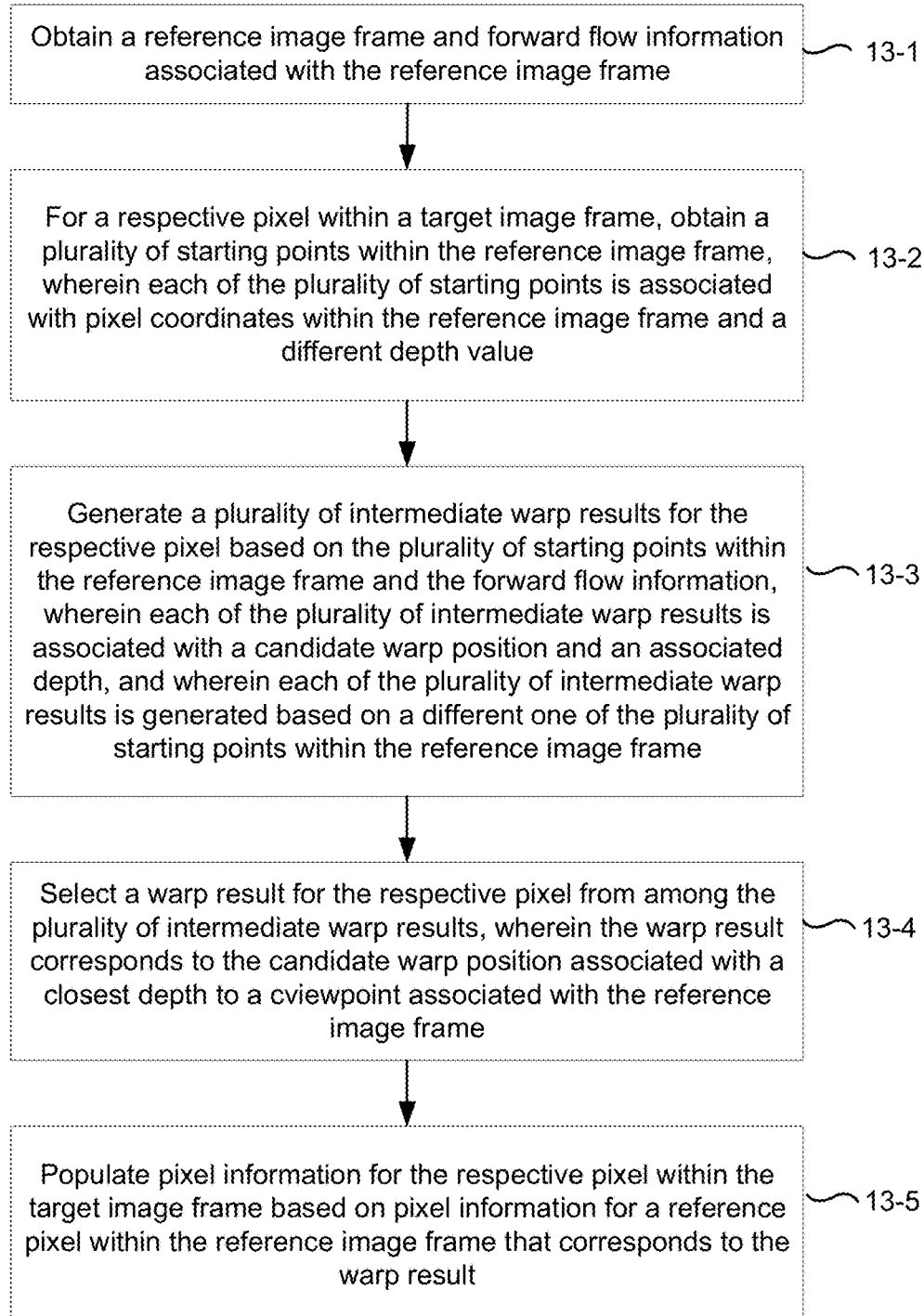
FIG. 13 is a flowchart representation of a method of inverse iterative warping based on the SRW algorithm in accordance with some implementations.

FIG. 13 is a flowchart representation of a method 1300 of inverse iterative warping based on a statistically robust warp (SRW) algorithm in accordance with some implementations. In various implementations, the method 1300 is performed by a device with one or more processors and non-transitory memory (e.g., the controller 110 in FIGS. 1A, 1B, and 2; the electronic device 120 in FIGS. 1A, 1B, and 3; or a suitable combination thereof) or a component thereof. In some implementations, the method 1300 is performed by processing logic, including hardware, firmware, software, or a combination thereof. In some implementations, the method 1300 is performed by a processor executing code stored in a non-transitory computer-readable medium (e.g., a memory). In various implementations, some operations in method 1300 are, optionally, combined and/or the order of some operations is, optionally, changed.

As described above, in computer graphics, significant coherence is exhibited across frames of an animation (temporal coherence) and across nearby views of a scene (spatial coherence). Current rendering pipelines recompute each frame, resulting in a large amount of repeated work. Current warping methods are able to synthesize a plausible target frame therebetween without performing the rasterization and shading, by reusing rendering results from neighboring frame(s). As one example, inverse iterative warping may be performed on a reference image to produce the target image. However, the final output of the inverse iterative warping operation is significantly impacted by a starting point chosen within the reference image similar to gradient descent. As described below, the method 1300 of inverse iterative warping is based on an SRW algorithm that performs multiple inverse warp operations from a plurality of starting points with varying depths for each pixel and chooses the best result from among the multiple inverse warp operations.

As represented by block 13-1, the method 1300 includes obtaining a reference image frame and forward flow information associated with the reference image frame. In some implementations, the device or a component thereof receives, retrieves, or generates the reference image frame. According to some implementations, the device or a component thereof (e.g., the rendering engine 252 in FIG. 2) renders the reference image based on a synthetic environment with one or more three-dimensional (3D) models. As such, in some implementations, the forward flow information corresponds to movement of the one or more 3D models within the synthetic environment across a plurality of image frames. In some implementations, the forward flow information corresponds to movement of the viewpoint of the synthetic environment across a plurality of image frames. According to some implementations, the device or a component thereof captures an image frame of physical environment captured with an associated image sensor, wherein the captured image frame corresponds to the reference image frame. As such, in some implementations, the forward flow information is based on movement information associated with a change of head pose, a change of gaze direction, a change of body pose, a change of camera pose, and/or the like. Thus, for example, the forward flow information is generated by the device or a component thereof (e.g., the forward flow generator 810 in FIGS. 2 and 8) based on head tracking information, eye tracking information, body pose tracking information, depth information, and/or the like.

As represented by block 13-2, the method 1300 includes, for a respective pixel within a target image frame (e.g., P(x,y)), obtaining a plurality of starting points within the reference image frame, wherein each of the plurality of starting points is associated with pixel coordinates within the reference image frame and a different depth value. For example, with reference to FIG. 9, the process 900 generates N candidate starting points with varying depths for a respective pixel P(x,y) within a target image frame at block 910. Furthermore, FIG. 10 shows an example depth hierarchy 1000 for the N candidate starting points in accordance with some implementations.

In some implementations, the plurality of starting points corresponds to a predetermined integer number of starting points such as N=4. In some implementations, each of the plurality of starting points is associated with a predetermined depth value. For example, the plurality of starting points corresponds to preset depth values such as 10 cm, 50 cm, 3 m, and 10 m. In some implementations, the device obtains the plurality of starting points by generating the plurality of starting points based on depth information associated with the reference image frame. For example, the plurality of starting points is generated based on depth hints associated with the reference image frame such as a depth value for a closest object in the reference image or associated scene, a depth value for a farthest object in the reference image or associated scene, estimated foreground and background depth values, cap depth value based on resolution, the forward flow information, and/or the like.

In some implementations, the pixel coordinates within the reference image frame are generated by applying an inverse transform to pixel coordinates associated with the respective pixel within the target image frame. According to some implementations, the inverse transform maps pixel coordinates within the target image frame to pixel coordinates within the reference image frame. For example, the inverse transform is based on the forward flow information (e.g., a vector field associated with motion across time and/or space).

As represented by block 13-3, the method 1300 includes generating a plurality of intermediate warp results for the respective pixel based on the plurality of starting points within the reference image frame and the forward flow information, wherein each of the plurality of intermediate warp results is associated with a candidate warp position and an associated depth, and wherein each of the plurality of intermediate warp results is generated based on a different one of the plurality of starting points within the reference image frame. For example, with reference to FIG. 9, the process 900 generates intermediate warp results 942A, . . . , 942N for the respective pixel P(x,y) as a result of convergence tests 940A, . . . , 940N associated with each of the N candidate starting points with varying depths for the respective pixel P(x,y).

In some implementations, for a respective starting point among the plurality of starting points, the method 1300 includes: performing a predetermined number of fixed-point iterations (FPIs) from the respective starting point within the reference image frame in order to generate a first candidate warp position and a first depth value; performing another fixed-point iteration from the first candidate warp position within the reference image frame in order to generate a second candidate warp position and a second depth value; determining whether a convergence condition is satisfied based on the first and second depth values; in accordance with a determination that the convergence condition is satisfied, selecting the second candidate warp position as a first intermediate warp result for the respective pixel; and in accordance with a determination that the convergence condition is not satisfied, selecting a candidate warp position between the first and second warp positions that is associated with a depth value closest to the viewpoint associated with the reference image frame as the first intermediate warp result for the respective pixel. In some implementations, the predetermined number of FPIs corresponds to a single FPI. In some implementations, the predetermined number of FPIs corresponds to two or more FPIs.

As one example, with reference to FIG. 9, the process 900 generates a first candidate warp result 922A and a second candidate warp result 932A associated with the first starting point for the respective pixel P(x,y) and selects an intermediate warp result 942A associated with the first starting point for the respective pixel P(x,y) based on the convergence test 940A, which is described in more detail with reference to FIG. 10. For example, the first candidate warp result 922A corresponds to a first warp position and an associated first depth value at t−1. For example, the second candidate warp result 932A corresponds to a second warp position and an associated second depth value at t. In some implementations, the convergence condition is satisfied when $$\frac{|z_i - z_{i-1}|}{\min(z_i, z_{i-1})} > \varepsilon,$$

where $z_i$ is the second depth value, $z_{i-1}$ is the first depth value, and $\varepsilon$ is a predefined constant In some implementations, the device also adds a constant to the depth value associated with the selected candidate warp result. One of ordinary skill in the art will appreciate how the process 900 may be applied to the N candidate starting points with varying depths for the respective pixel P(x,y) to generate the plurality of intermediate warp results 942A, . . . , 942N.

As represented by block 13-4, the method 1300 includes selecting a warp result for the respective pixel from among the plurality of intermediate warp results, wherein the warp result corresponds to the candidate warp position associated with a closest depth to a viewpoint (e.g., a camera pose/position) associated with the reference image frame. According to some implementations, the warp result includes a warp position and an associated depth value. For example, with reference to FIG. 9, the process 900 selects the warp result 952 for the respective pixel P(x,y) (at block 950) that corresponds to one of the intermediate warp results 942A, . . . , 942N that has a depth value that is closest to the viewpoint 1002 (e.g., a camera pose/position).

In some implementations, the method 1300 includes: identifying a quad-group of pixels that includes the respective pixel within the target image frame; selecting a quad-group warp result from among the warp result for the respective pixel and warp results for other pixels in the quad-group of pixels that corresponds to a depth closest to the viewpoint associated with the reference image frame; and updating the pixel information (e.g., RGB values) for the respective pixel within the target image frame based on pixel information for a reference pixel within the reference image frame that corresponds to the quad-group warp result. For example, with reference to FIG. 12 the process 1200 determines a warp result for a quad-group of pixels that is closest to the viewpoint (e.g., a camera pose/position) associated with the reference image frame based on the per-pixel warp results (e.g., warp results 952A, 952B, 952C, and 952D in FIG. 12). In some implementations, selecting the quad-group warp result includes performing XOR operations across rows of the quad-group, followed by an XOR down the columns of the quad-group to arrive at the quad-group warp result.

In some implementations, the method 1300 includes, after selecting the quad-group warp result, upscaling the warp resolution associated with the quad-group warp result by performing an additional fixed-point iteration from a warp position associated with the quad-group warp result. For example, with reference to FIG. 12 the process 1200 (at block 1220) upscales the warp resolution associated with the warp result from block 1210 by performing an additional FPI operation with the warp result from block 1210 as a starting point. In some implementations, the device performs the upscaling operation when convergence occurs (e.g., occlusion). However, the device may not perform the upscaling operation when convergence does not occur (e.g., disocclusion) to avoid adding noise.

In some implementations, as an alternative workflow, the device: identifies a quad-group that corresponds to a respective pixel; determines a plurality of starting point for the quad-group with varying depth (e.g., based on the block 910 in FIG. 9); assigns a different starting point to each pixel in the quad-group; determines intermediate warp results on a per-pixel basis (e.g., based on the data flow between blocks 920A, 930A, and 940A in FIG. 9); and propagates a best warp result across the pixels in the quad-group (e.g., as shown by the process 1200 in FIG. 12).

As represented by block 13-5, the method 1300 includes populating pixel information (e.g., RGB values) for the respective pixel within the target image frame based on pixel information for a reference pixel within the reference image frame that corresponds to the warp result. For example, the pixel information includes RGB values, depth information, etc. According to some implementations, the device or a component thereof (e.g., the pixel population engine 850 in FIGS. 2 and 8) looks up RGB values for a pixel within the reference image that corresponds to the warp result (e.g., the warp position within the warp result) and populates the respective pixel within the target image frame based on said RGB values. In some implementations, the method 1300 corresponds to inverse warping where the target image frame is populated on a pixel-by-pixel basis pixel by sampling the reference image frame and the associated forward flow information. As such, the target image frame is a warped version of the reference image frame.

FIG. 14 is a block diagram of an example data processing architecture 1400 an adaptive statistically robust warp (ASRW) algorithm in accordance with some implementations. While certain specific features are illustrated, those skilled in the art will appreciate from the present disclosure that various other features have not been illustrated for the sake of brevity, and so as not to obscure more pertinent aspects of the implementations disclosed herein. According to some implementations, the data processing architecture 1400 is located within the controller 110 in FIGS. 1A, 1B, and 2; the electronic device 120 in FIGS. 1A, 1B, and 3; or a suitable combination thereof. According to some implementations, the data processing architecture 1400 in FIG. 14 is similar to and adapted from the data processing architecture 800 in FIG. 8. Thus, similar reference numbers are used in FIGS. 8 and 14 for some components.

According to some implementations, the data processing architecture 1400 is configured to generate a target (warped) image frame 865 according to an adaptive statistically robust warp (ASRW) algorithm. To that end, as a non-limiting example, in some implementations, the data processing architecture 1400 includes the forward flow generator 810, a downsampler 1410, a neighborhood characterization vector generator 1420, the inverse warping engine 830, and the pixel population engine 850.

In some implementations, the forward flow generator 810 is configured to generate forward flow information 820 based on the depth information 802 and the movement information 804. For example, the depth information 802 corresponds to a depth mesh generated based on depth data associated with a physical environment or a 3D modeling/rendering environment. For example, the movement information 804 corresponds to head tracking information, eye tracking information, body pose tracking information, and/or the like. As another example, the movement information 804 corresponds to displacement, velocity, and/or acceleration of a head or camera pose. According to some implementations the forward flow information 820 corresponds to a vector field or the like that characterizes motion across at least the one or more reference image frames 842.

In some implementations, the downsampler 1410 is configured to downsample the forward flow information 1410 into A×B pixel neighborhoods within the one or more reference image frames 842. For example, a pixel neighborhood corresponds to a quad-group of pixels or the like. In another example a pixel neighborhood corresponds to a tile of pixels associated with Z percentage (e.g., 5% to 10%) of the one or more reference image frames 842. In this example, the downsampler 1410 downsamples the one or more reference image frames 842 to 10×10 or 20×20 size tiles, where the tile size is big enough to encapsulate reasonable motion within the scene (e.g., a reconstructable scene would have less than 30% movement), while still being granular enough to contain only information that is important for each part of the scene.

In some implementations, the neighborhood characterization vector generator 1420 is configured to generate characterization vectors 1425 for each A×B pixel neighborhood within the one or more reference image frames 842. According to some implementations, a respective characterization vector among the characterization vectors 1425 for a respective neighborhood includes a dominant movement direction for the respective neighborhood relative to the viewpoint, object motion within the respective neighborhood relative, deviation of motion for the respective neighborhood, a background depth value for the respective neighborhood, a foreground depth value for the respective neighborhood, a histogram representation of depth for the respective neighborhood, the mean depth value for the respective neighborhood, the mode value for depth in the respective neighborhood, and/or the like.

In some implementations, the inverse warping engine 830 is configured to generate warp positions 832 for each of a plurality of pixels in a target (warped) image frame 865 based on the forward flow information 820 and the characterization vectors 1425. According to some implementations, the inverse warping engine 830 includes a warp quality selector 1430 configured to select a warp quality (e.g., higher quality iterative warp, lower quality iterative warp, or planar warp) for a respective pixel P(x,y) within the target (warped) image frame 865. The warp quality selection process is described in more detail below with reference to FIG. 15.

In some implementations, the pixel population engine 850 populates pixel information for each of the plurality of pixels in the target (warped) image frame 865 by looking up pixel information from the one or more reference images frames 842 based on the warp positions 832. For example, the one or more reference image frames 842 correspond to rendered image frames associated with a 3D modeling/rendering environment. For example, the one or more reference image frames 842 correspond to image frames associated with a physical environment captured by an image sensor.

Figure 15:
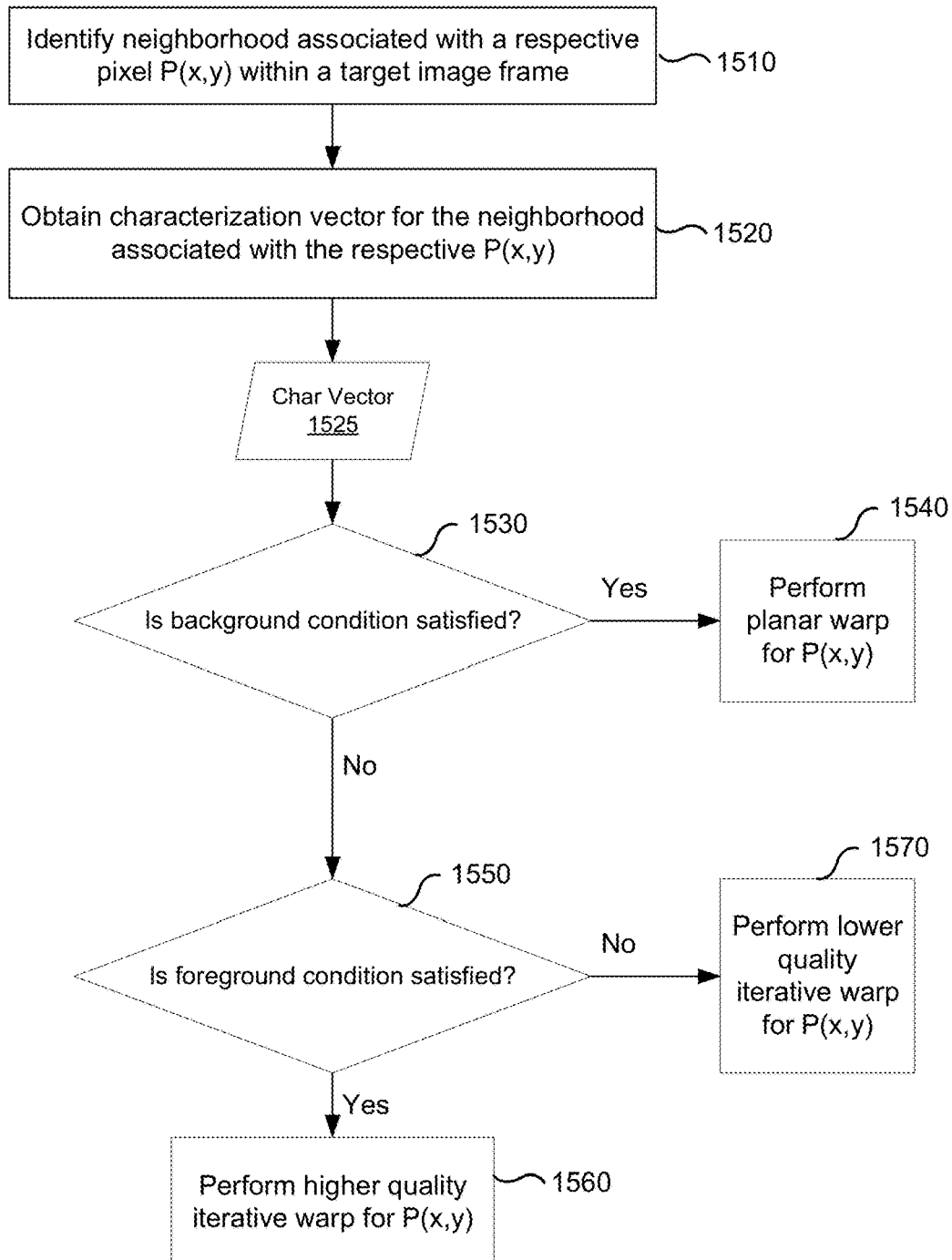
FIG. 15 is a flowchart representation of a process for selecting a warp quality for a respective pixel within a target image frame in accordance with some implementations.

FIG. 15 is a flowchart representation of a process 1500 for selecting a warp quality for a respective pixel within a target image frame in accordance with some implementations. In various implementations, the process 1500 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the warp quality selector 1430 in FIG. 14). In some implementations, the process 1500 is performed by processing logic, including hardware, firmware, software, or a combination thereof. In some implementations, the process 1500 is performed by a processor executing code stored in a non-transitory computer-readable medium (e.g., a memory). In various implementations, some operations in the process 1500 are, optionally, combined and/or the order of some operations is, optionally, changed.

As represented by block 1510, the process 1500 includes identifying a neighborhood associated with a respective pixel P(x,y) within a target image frame. In some implementations, the device identifies a respective neighborhood of pixels within the reference image frame that corresponds to the respective pixel within the target image frame based on the forward flow information 820 and the UV coordinates 902 for the respective pixel P(x,y). According to some implementations, the UV coordinates 902 is determined based on a distortion mesh that at least includes the respective pixel P(x,y).

As represented by block 1520, the process 1500 includes obtaining a characterization vector 1525 for the neighborhood identified in block 1510. According to some implementations, the characterization vector 1525 includes a dominant movement direction for the neighborhood, a background depth value for the neighborhood, a foreground depth value for the neighborhood, and/or the like.

As represented by block 1530, the process 1500 includes determining whether a background condition is satisfied based on the characterization vector 1525 for the neighborhood. For example, the background condition is satisfied when the foreground and background depth values are equivalent (or within a predetermined tolerance) and the depth values are far from the viewpoint 1002 (or the depth values are greater than Q cm).

Figure 16:
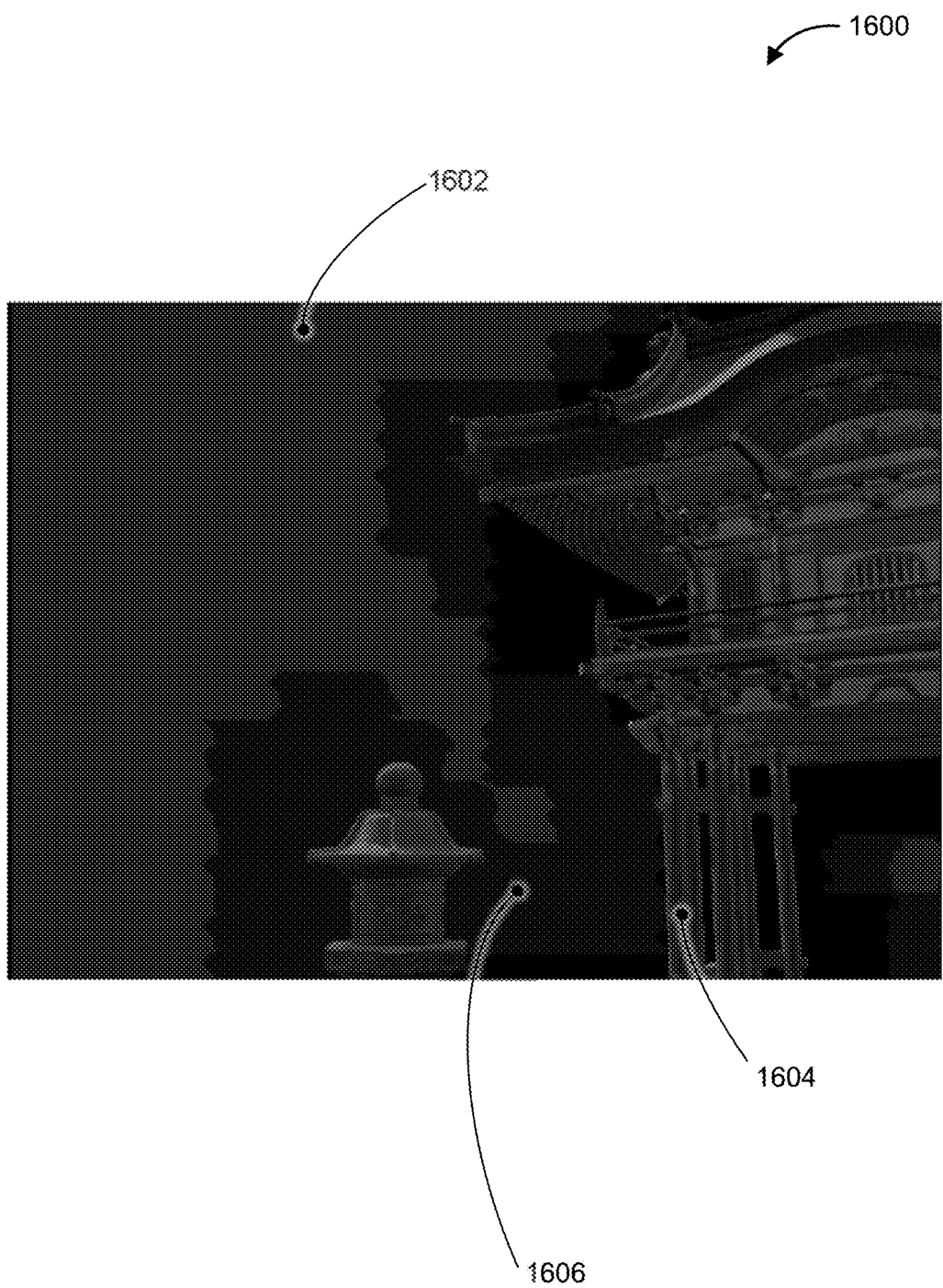
FIG. 16 shows an example image in accordance with some implementations.

If the background condition is satisfied ("Yes" branch from block 1530), as represented by block 1540, the process 1500 includes performing a planar warp operation for the respective pixel P(x,y) within the target image frame. According to some implementations, the planar warp operation is described in more detail below with reference to FIG. 17A. For example, FIG. 16 shows an example image 1600 where the pixel 1602 satisfies the background condition.

If the background condition is not satisfied ("No" branch from block 1530), as represented by block 1550, the process 1500 includes determining whether a foreground condition is satisfied based on the characterization vector 1525 for the neighborhood. For example, the foreground condition is satisfied when the foreground and background depth values are at least a predetermined distance apart and (optionally) also when the foreground depth value is close to the viewpoint 1002 (e.g., P cm or less).

If the foreground condition is satisfied ("Yes" branch from block 1550), as represented by block 1560 the process 1500 includes performing a higher quality iterative warp operation for the respective pixel P(x,y) within the target image frame. According to some implementations, the higher quality iterative warp operation is described in more detail below with reference to FIG. 17B. For example, FIG. 16 shows the example image 1600 where the pixel 1604 satisfies the foreground condition.

If the foreground condition is not satisfied ("No" branch from block 1550), as represented by block 1570 the process 1500 includes performing a lower quality iterative warp operation for the respective pixel P(x,y) within the target image frame. According to some implementations, the lower quality iterative warp operation is described in more detail below with reference to FIG. 17C. For example, FIG. 16 shows the example image 1600 where the pixel 1606 does not satisfy the foreground and background conditions. In other words, the pixel 1606 straddles the foreground and background.

Figure 17A:
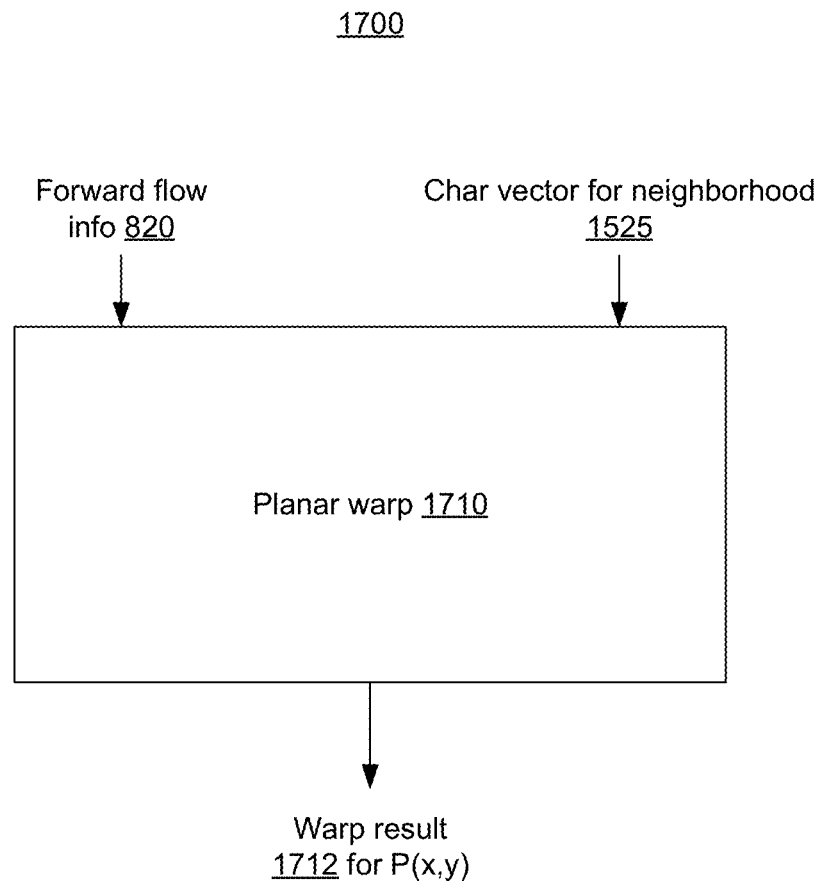
FIG. 17A is flowchart representation of a process for performing a planar warp operation for a respective pixel in accordance with some implementations.

FIG. 17A is flowchart representation of a process 1700 for performing a planar warp operation for a respective pixel in accordance with some implementations. In various implementations, the process 1700 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8 or 14). In some implementations, the process 1700 is performed by processing logic, including hardware, firmware, software, or a combination thereof. In some implementations, the process 1700 is performed by a processor executing code stored in a non-transitory computer-readable medium (e.g., a memory). In various implementations, some operations in the process 1700 are, optionally, combined and/or the order of some operations is, optionally, changed. For example, the process 1700 corresponds to the block 1540 in FIG. 15.

As represented by block 1710, the process 1700 includes performing a planar warp operation based on the forward flow information 820 and the characterization vector 1525 for the neighborhood associated with the respective pixel P(x,y) in order to generate a warp result 1712 for the respective pixel P(x,y). According to some implementations, the planar warp operation corresponds to a geometric or translational offset based on the forward flow information 820. According to some implementations, the warp result 1712 for the respective pixel P(x,y) includes a warp position and an associated depth value.

Figure 17B:
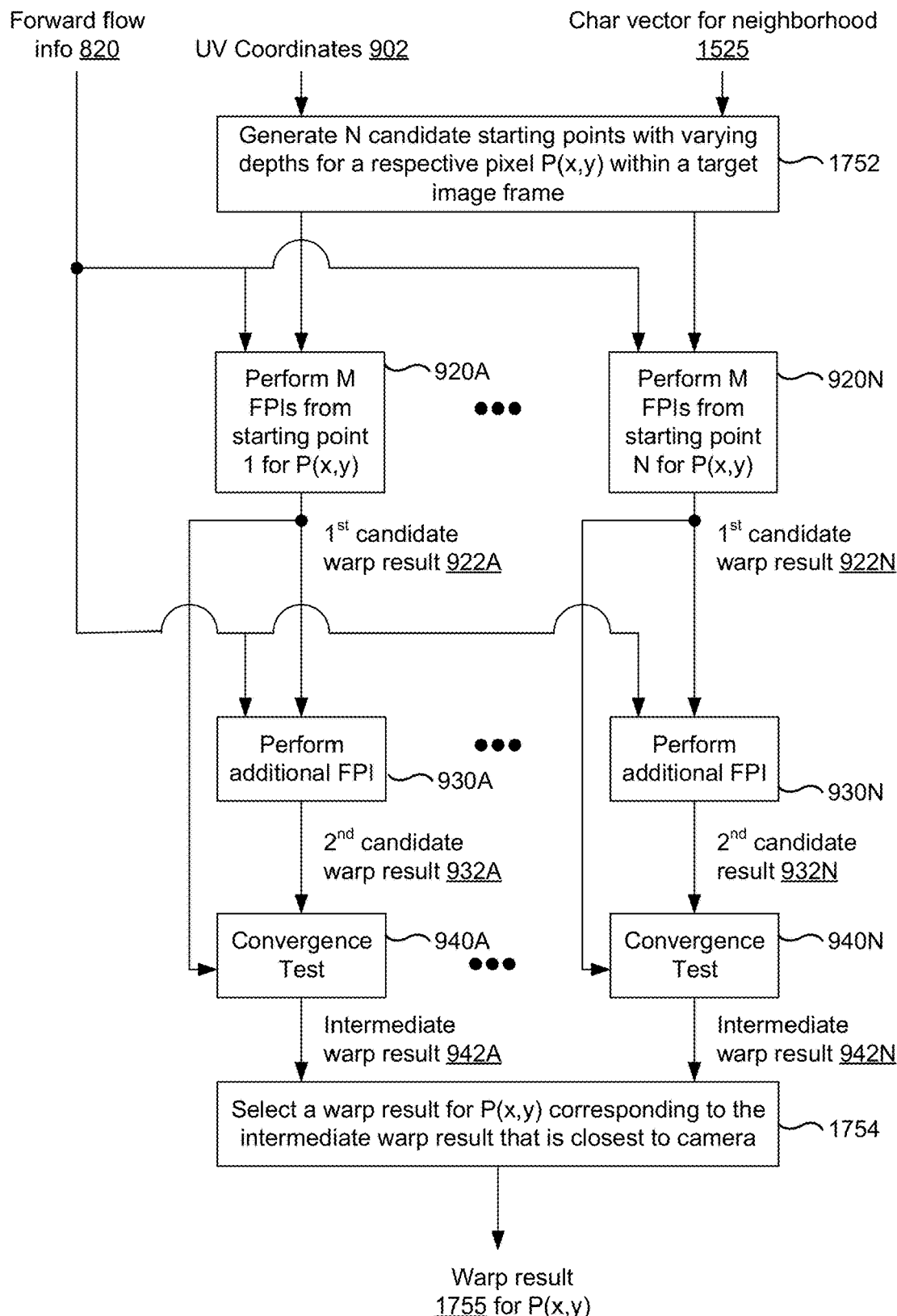
FIG. 17B is flowchart representation of a process for performing a higher quality iterative warp operation for a respective pixel in accordance with some implementations.

FIG. 17B is flowchart representation of a process 1750 for performing a higher quality iterative warp operation for a respective pixel in accordance with some implementations. In various implementations, the process 1750 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8 or 14). In some implementations, the process 1750 is performed by processing logic, including hardware, firmware, software, or a combination thereof. In some implementations, the process 1750 is performed by a processor executing code stored in a non-transitory computer-readable medium (e.g., a memory). In various implementations, some operations in the process 1750 are, optionally, combined and/or the order of some operations is, optionally, changed.

For example, the process 1750 corresponds to the block 1560 in FIG. 15. According to some implementations, the process 1750 in FIG. 17B is similar to and adapted from the process 900 in FIG. 9. Thus, similar reference numbers are used in FIGS. 9 and 17B for some components and only the differences herein will be discussed for the sake of brevity.

As represented by block 1752, the process 1750 includes generating N candidate starting points with varying depths for a respective pixel P(x,y) within a target image frame based on UV coordinates 902 for the respective pixel P(x,y) and the characterization vector 1525 for the neighborhood associated with the respective pixel P(x,y).

Figure 18:
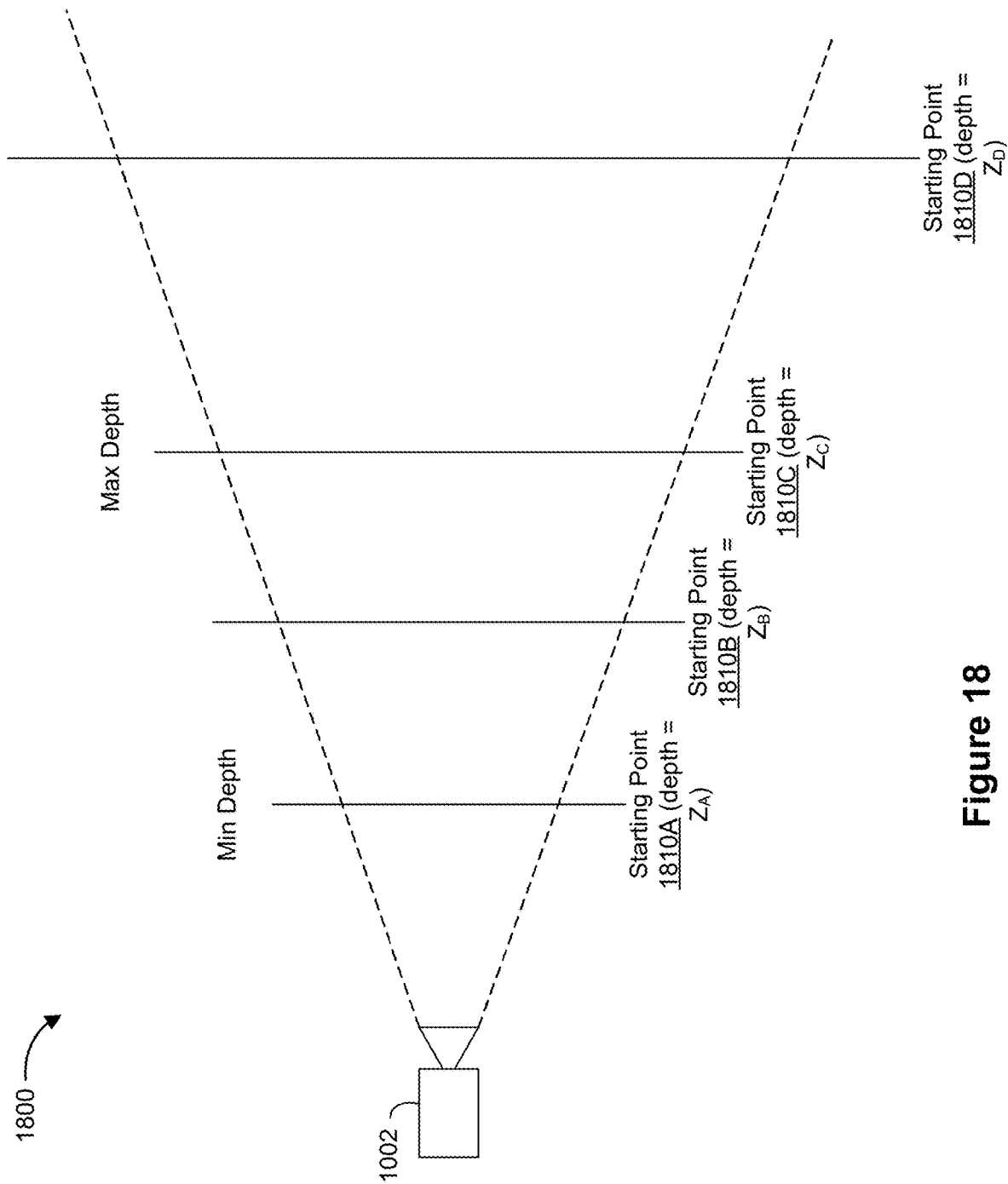
FIG. 18 is an illustration of a depth hierarchy for N candidate starting points in accordance with some implementations.

FIG. 18 is an illustration of a depth hierarchy 1800 for the N candidate starting points in accordance with some implementations. As shown in FIG. 18, assuming that, for example, N=4, the N candidate starting points include: a starting point 1810A with depth $Z_A$ relative to a viewpoint 1002 (e.g., a camera pose/position); a starting point 1810B with depth $Z_B$ relative to the viewpoint 1002; a starting point 1810C with depth $Z_C$ relative to the viewpoint 1002; and a starting point 1810D with depth $Z_D$ relative to the viewpoint 1002, where $Z_A < Z_B < Z_C < Z_D$. In some implementations, the viewpoint 1002 corresponds to a position of a camera, image sensor, or the like relative to the reference image frame.

In some implementations, $Z_A$, $Z_B$, $Z_C$, $Z_D$ are dynamically determined based on the foreground and background depths from the characterization vector 1525 associated with a respective pixel P(x,y). As shown in FIG. 18, $Z_A$ corresponds to the foreground depth $Z_B$ corresponds to a depth value between the foreground and background depths. $Z_C$ corresponds to the background depth. $Z_D$ corresponds to maximum depth value based on resolution. One of ordinary skill in the art will appreciate that the N candidate starting points may selected in myriad manners in various other implementations.

As represented by block 1754, the process 1750 includes selecting a warp result 1755 for the respective pixel P(x,y) that corresponds to one of the intermediate warp results 942A, . . . , 942N that has a depth value that is closest to the viewpoint 1002 (e.g., a camera pose/position). According to some implementations, the warp result 1755 includes a warp position and an associated depth value.

Figure 17C:
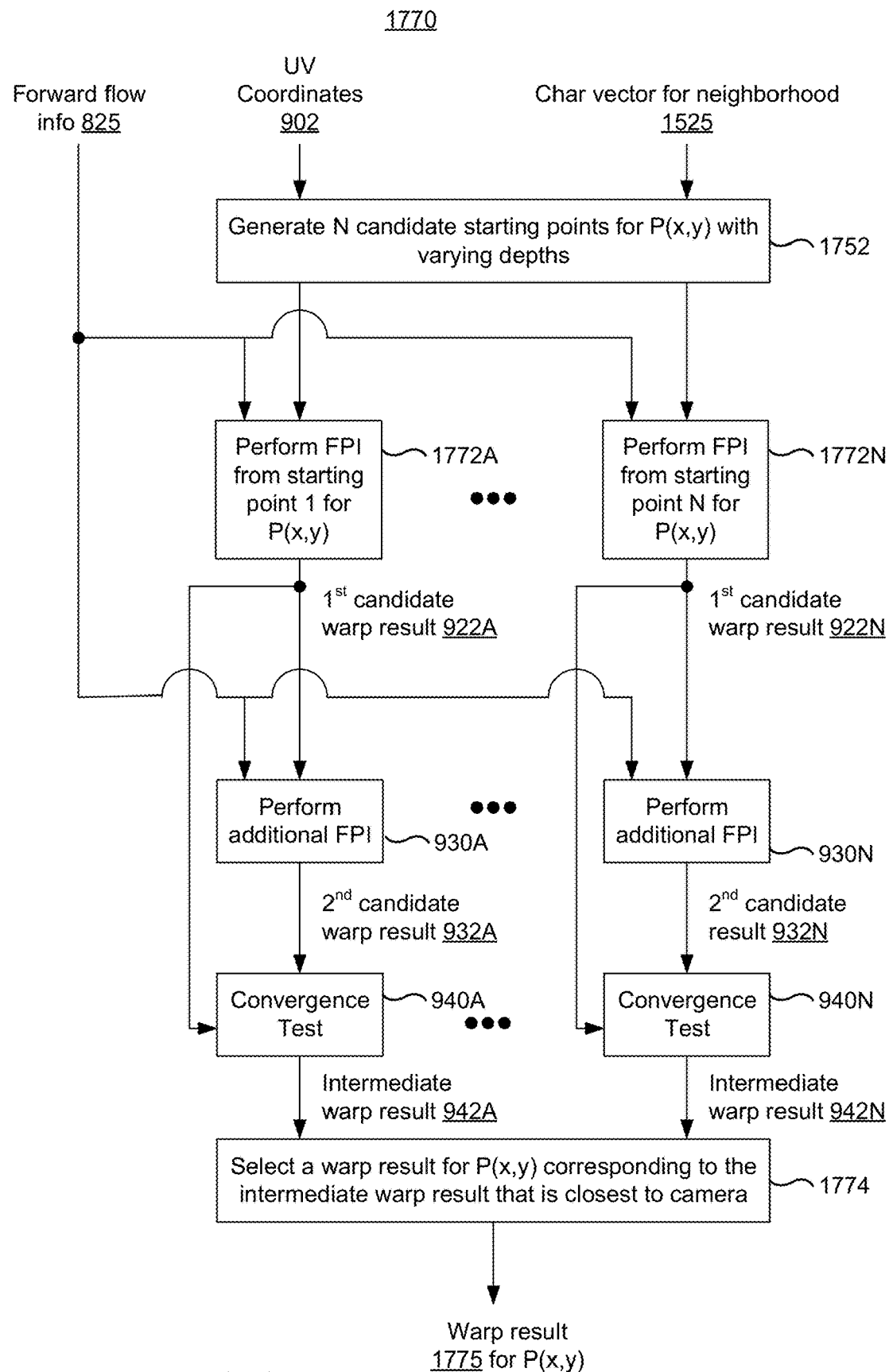
FIG. 17C is flowchart representation of a process for performing a lower quality iterative warp operation for a respective pixel in accordance with some implementations.

FIG. 17C is flowchart representation of a process 1770 for performing a lower quality iterative warp operation for a respective pixel in accordance with some implementations. In various implementations, the process 1770 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8 or 14). In some implementations, the process 1770 is performed by processing logic, including hardware, firmware, software, or a combination thereof. In some implementations, the process 1770 is performed by a processor executing code stored in a non-transitory computer-readable medium (e.g., a memory). In various implementations, some operations in the process 1770 are, optionally, combined and/or the order of some operations is, optionally, changed.

For example, the process 1770 corresponds to the block 1570 in FIG. 15. According to some implementations, the process 1770 in FIG. 17C is similar to and adapted from the process 900 in FIG. 9 and the process 1750 in FIG. 17B. Thus, similar reference numbers are used in FIGS. 9, 17B, and 17C for some components and only the differences herein will be discussed for the sake of brevity.

As represented by block 1772A, the process 1770 includes performing a single FPI from a first starting point among the N candidate starting points in order to generate a first candidate warp result 922A associated with the first starting point for P(x,y). According to some implementations, the FPI operation is performed based on a reference image and the forward flow information 820 from the selected starting point. For example, the first candidate warp result 922A corresponds to a first warp position and an associated first depth value at t−1. Similarly, as represented by block 1772B, the process 1770 includes performing a single FPI using from an Nth starting point among the N candidate starting points in order to generate a first candidate warp result 922N associated with the Nth starting point for P(x,y). One of ordinary skill in the art will appreciate how to perform the balance of the blocks 1772A, . . . 1772N based on the details described above.

As represented by block 1774, the process 1770 includes selecting a warp result 1775 for the respective pixel P(x,y) that corresponds to one of the intermediate warp results 942A, . . . , 942N that has a depth value that is closest to the viewpoint 1002 (e.g., a camera pose/position). According to some implementations, the warp result 1775 includes a warp position and an associated depth value.

Figure 19A:
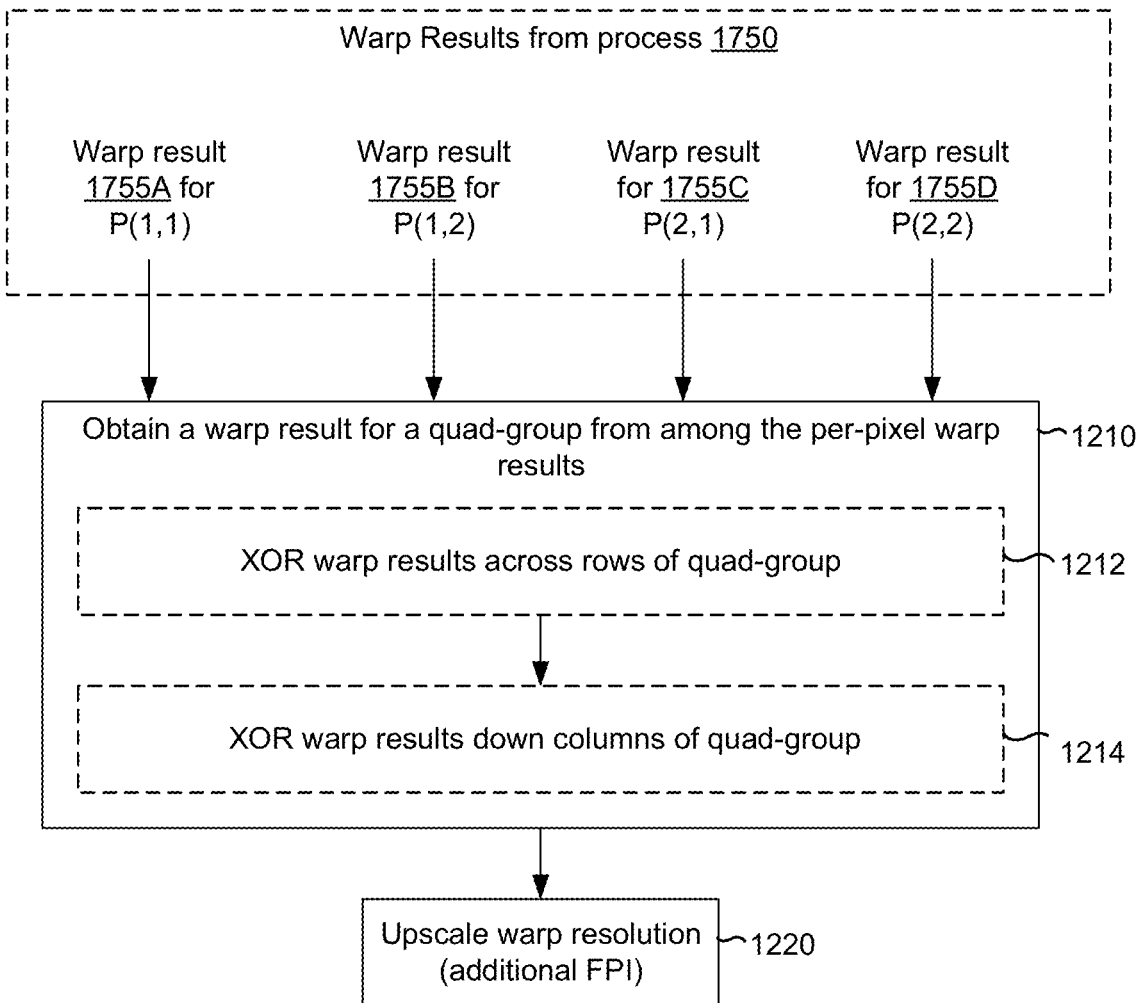
FIGS. 19A and 19B are flowchart representations of processes for determining a warp result for a quad-group of pixels in accordance with some implementations.

FIG. 19A is a flowchart representation of a process 1900 for determining a warp result for a quad-group of pixels in accordance with some implementations. In various implementations, the process 1900 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8 or 14). In some implementations, the process 1900 is performed by processing logic, including hardware, firmware, software, or a combination thereof. In some implementations, the process 1900 is performed by a processor executing code stored in a non-transitory computer-readable medium (e.g., a memory). In various implementations, some operations in the process 1900 are, optionally, combined and/or the order of some operations is, optionally, changed.

According to some implementations, the process 1900 in FIG. 19A is similar to and adapted from the process 1200 in FIG. 12. Thus, similar reference numbers are used in FIGS. 12 and 19A for some components and only the differences herein will be discussed for the sake of brevity. For example, a respective quad-group includes pixels P(1,1), P(1,2), P(2,1), and P(2,2). One of ordinary skill in the art will appreciate that the target image frame may be separated into any number of A×B pixel groupings in various other implementations. For example, warp results 1755A, 1755B, 1755C, and 1755D for pixels P(1,1), P(1,2), P(2,1), and P(2,2), respectively, are generated based on the process 1750 for performing a higher quality iterative warp operation described above with reference to FIG. 17B.

Figure 19B:
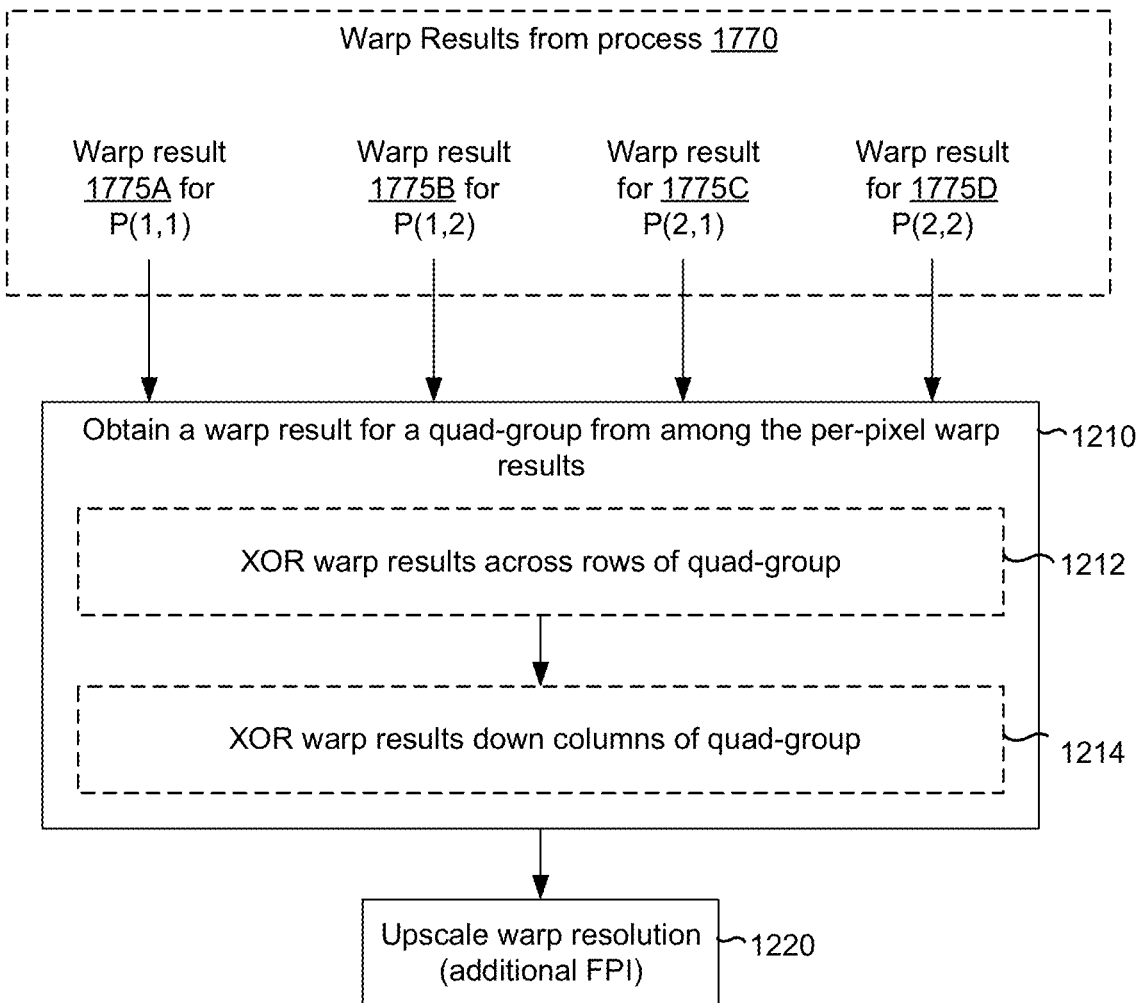

FIG. 19B is a flowchart representation of a process 1950 for determining a warp result for a quad-group of pixels in accordance with some implementations. In various implementations, the process 1950 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof (e.g., the inverse warping engine 830 in FIG. 8 or 14). In some implementations, the process 1950 is performed by processing logic, including hardware, firmware, software, or a combination thereof. In some implementations, the process 1950 is performed by a processor executing code stored in a non-transitory computer-readable medium (e.g., a memory). In various implementations, some operations in the process 1950 are, optionally, combined and/or the order of some operations is, optionally, changed.

According to some implementations, the process 1950 in FIG. 19B is similar to and adapted from the process 1200 in FIG. 12. Thus, similar reference numbers are used in FIGS. 12 and 19B for some components and only the differences herein will be discussed for the sake of brevity. For example, a respective quad-group includes pixels P(1,1), P(1,2), P(2,1), and P(2,2). One of ordinary skill in the art will appreciate that the target image frame may be separated into any number of A×B pixel groupings in various other implementations. For example, warp results 1775A, 1775B, 1775C, and 1775D for pixels P(1,1), P(1,2), P(2,1), and P(2,2), respectively, are generated based on the process 1770 for performing a lower quality iterative warp operation described above with reference to FIG. 17C.

Figure 20:
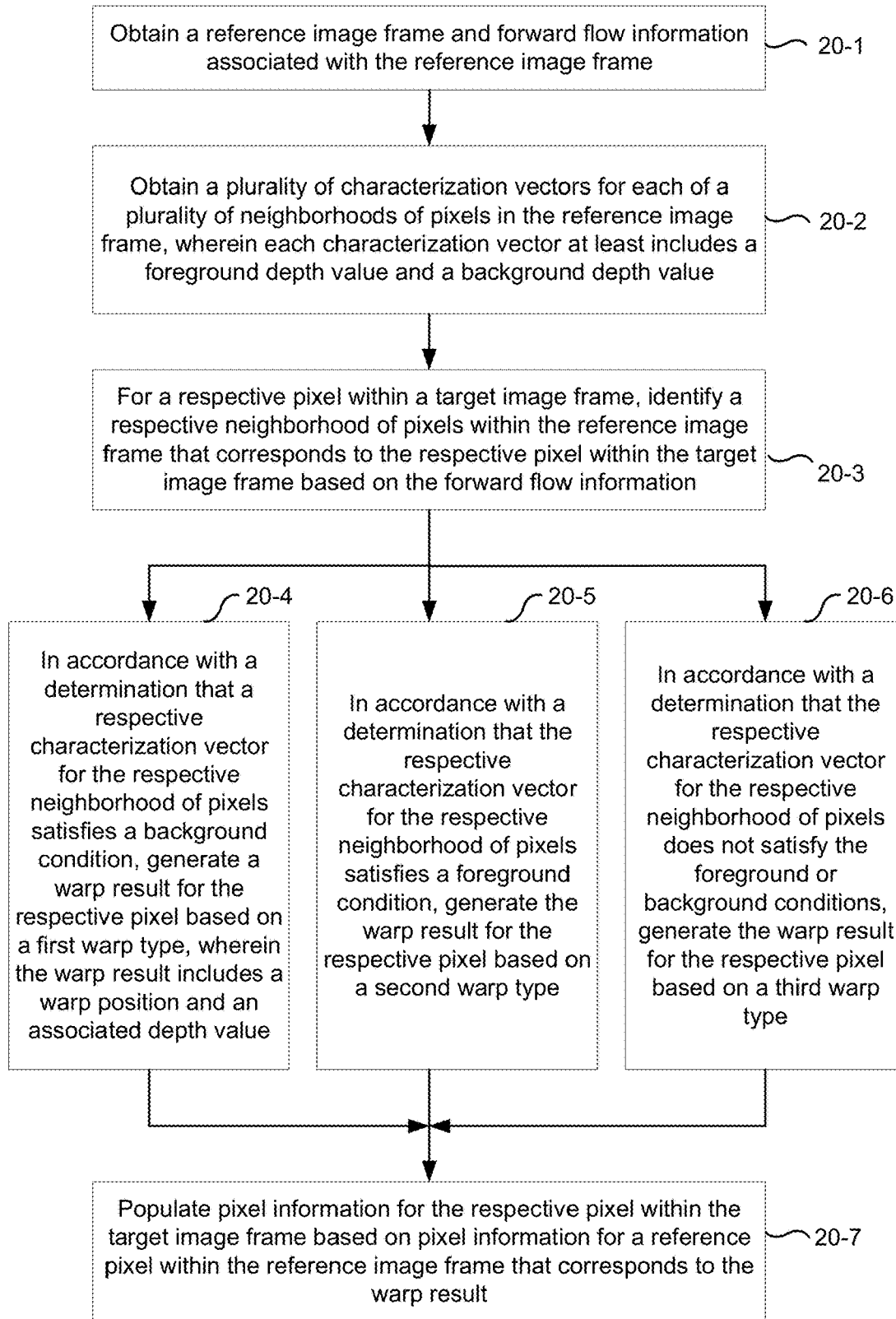
FIG. 20 is a flowchart representation of a method of inverse iterative warping based on the ASRW algorithm in accordance with some implementations.

FIG. 20 is a flowchart representation of a method 2000 of inverse iterative warping based on an adaptive statistically robust warp (ASRW) algorithm in accordance with some implementations. In various implementations, the method 2000 is performed by a device with one or more processors and non-transitory memory (e.g., the controller 110 in FIGS. 1A, 1B, and 2; the electronic device 120 in FIGS. 1A, 1B, and 3; or a suitable combination thereof) or a component thereof. In some implementations, the method 2000 is performed by processing logic, including hardware, firmware, software, or a combination thereof. In some implementations, the method 2000 is performed by a processor executing code stored in a non-transitory computer-readable medium (e.g., a memory). In various implementations, some operations in method 2000 are, optionally, combined and/or the order of some operations is, optionally, changed.

As described above, in computer graphics, significant coherence is exhibited across frames of an animation (temporal coherence) and across nearby views of a scene (spatial coherence). Current rendering pipelines recompute each frame, resulting in a large amount of repeated work. Current warping methods are able to synthesize a plausible target frame therebetween without performing the rasterization and shading, by reusing rendering results from neighboring frame(s). As one example, inverse iterative warping may be performed on a reference image to produce the target image. However, the final output of the inverse iterative warping operation is significantly impacted by a starting point chosen within the reference image similar to gradient descent. As described below, the method 2000 of inverse iterative warping is based on an ASRW algorithm that selects a warp quality (e.g., higher quality iterative warp, lower quality iterative warp, or planar warp) for a neighborhood of pixels based on foreground and background depth values associated with neighborhood of pixels and subsequently populates pixel information for the neighborhood of pixels in a target image frame based on pixel information for reference pixels within a reference image frame that corresponds to the warp result.

As represented by block 20-1, the method 2000 obtaining a reference image frame and forward flow information associated with the reference image frame. In some implementations, the device or a component thereof receives, retrieves, or generates the reference image frame. According to some implementations, the device or a component thereof (e.g., the rendering engine 252 in FIG. 2) renders the reference image based on a synthetic environment with one or more three-dimensional (3D) models. As such, in some implementations, the forward flow information corresponds to movement of the one or more 3D models within the synthetic environment across a plurality of image frames. In some implementations, the forward flow information corresponds to movement of the viewpoint of the synthetic environment across a plurality of image frames. According to some implementations, the device or a component thereof captures an image frame of physical environment captured with an associated image sensor, wherein the captured image frame corresponds to the reference image frame. As such, in some implementations, the forward flow information is based on movement information associated with a change of head pose, a change of gaze direction, a change of body pose, a change of camera pose, and/or the like. Thus, for example, the forward flow information is generated by the device or a component thereof (e.g., the forward flow generator 810 in FIGS. 2 and 8) based on head tracking information, eye tracking information, body pose tracking information, depth information, and/or the like.

As represented by block 20-2, the method 2000 includes obtaining a plurality of characterization vectors for each of a plurality of neighborhoods of pixels in the reference image frame, wherein each characterization vector at least includes a foreground depth value and a background depth value. For example, with reference to FIG. 14, the neighborhood characterization vector generator 1420 is configured to generate characterization vectors 1425 for A×B pixel neighborhood within the one or more reference image frames 842. According to some implementations, a respective characterization vector among the characterization vectors 1425 for a respective neighborhood includes a dominant movement direction for the respective neighborhood, a background depth value for the respective neighborhood, a foreground depth value for the respective neighborhood, and/or the like.

As represented by block 20-3, the method 2000 includes, for a respective pixel within a target image frame, identifying a respective neighborhood of pixels within the reference image frame that corresponds to the respective pixel within the target image frame based on the forward flow information. In some implementations, the respective neighborhood of pixels within the reference image frame that corresponds to the respective pixel within the target image frame is identified based on the forward flow information and UV coordinates 902 for the respective pixel P(x,y). According to some implementations, the UV coordinates 902 is determined based on a distortion mesh that at least includes the respective pixel P(x,y).

In some implementations, the pixel coordinates within the reference image frame are generated by applying an inverse transform to pixel coordinates associated with the respective pixel within the target image frame. According to some implementations, the inverse transform maps pixel coordinates within the target image frame to pixel coordinates within the reference image frame. For example, the inverse transform is based on the forward flow information (e.g., a vector field associated with motion across time and/or space).

In some implementations, the method 2000 includes obtaining a characterization vector for the respective neighborhood identified in block 20-3. According to some implementations, the characterization vector includes a dominant movement direction for the respective neighborhood, a background depth value for the respective neighborhood, a foreground depth value for the respective neighborhood, and/or the like. In some implementations, the foreground and background depth values corresponds to minimum and maximum depth values for the neighborhood. In some implementations, the characterization vector also includes a forward flow value and direction for the neighborhood which may also be referred to as the maximum flow or dominant motion vector. For example, the neighborhood of pixels corresponds to a quad-group or tile of pixels.

As represented by block 20-4, the method 2000 includes, in accordance with a determination that a respective characterization vector for the respective neighborhood of pixels satisfies a background condition, generating a warp result for the respective pixel based on a first warp type, wherein the warp result includes a warp position and an associated depth value. In some implementations, the first warp type corresponds to a planar warp operation, which is described in more detail with reference to FIG. 17A. According to some implementations, the planar warp corresponds to a geometric or translational offset based on the forward flow information. In some implementations, the background condition is satisfied when the foreground and background depth values for the respective neighborhood of pixels are substantially similar (i.e., within a predefined tolerance value) and satisfy a farness threshold value (e.g., the depth values are greater than a first distance threshold of Q cm to the viewpoint associated with the reference image). According to some implementations, the warp result from the block 20-4 includes a warp position and an associated depth value.

As represented by block 20-5, the method 2000 includes, in accordance with a determination that the respective characterization vector for the respective neighborhood of pixels satisfies a foreground condition, generating the warp result for the respective pixel based on a second warp type. In some implementations, the second warp type corresponds to a higher quality iterative warp, which is described in more detail with reference to FIG. 17B. In some implementations, the foreground condition is satisfied when the foreground and background depth values are at least a predetermined distance apart and (optionally) also when the foreground depth value satisfies a nearness threshold value (e.g., the foreground depth value is less than a second distance threshold of P cm to the viewpoint associated with the reference image). According to some implementations, the warp result from the block 20-5 includes a warp position and an associated depth value.

In some implementations, the method 2000 includes: in accordance with the determination that the respective characterization vector for the respective neighborhood of pixels satisfies the foreground condition: obtaining a plurality of starting points within the reference image frame based on the respective characterization vector for the respective neighborhood of pixels, wherein each of the plurality of starting points is associated with pixel coordinates within the reference image frame and a different depth value; and performing the higher quality iterative warp by: generating a plurality of intermediate warp results for the respective pixel based on the plurality of starting points within the reference image frame and the forward flow information, wherein each of the plurality of intermediate warp results is associated with a candidate warp position and an associated depth, and wherein each of the plurality of intermediate warp results is generated based on a different one of the plurality of starting points within the reference image frame; and selecting a warp result for the respective pixel from among the plurality of intermediate warp results, wherein the warp result corresponds to the candidate warp position associated with a depth closest to a viewpoint associated with the reference image frame. For example, FIG. 18 shows an example depth hierarchy 1800 for the N candidate starting points in accordance with some implementations. For example, with reference to FIG. 17B, the process 1750 generates intermediate warp results 942A, . . . , 942N for the respective pixel P(x,y) as a result of convergence tests 940A, . . . , 940N associated with each of the N candidate starting points with varying depths for the respective pixel P(x,y). For example, with further reference to FIG. 17B, the process 1750 generates a warp result 1755 for the respective pixel P(x,y) that includes a warp position and an associated depth value based on the higher quality iterative warp operation.

In some implementations, with respect to the second warp type, the method 2000 includes: for a respective starting point among the plurality of starting points: performing two or more fixed-point iterations from the respective starting point within the reference image frame in order to generate a first candidate warp position and a first depth value; performing another fixed-point iteration from the first candidate warp position within the reference image frame in order to generate a second candidate warp position and a second depth value; determining whether a convergence condition is satisfied based on the first and second depth values; in accordance with a determination that the convergence condition is satisfied, selecting the second candidate warp position as a first intermediate warp result for the respective pixel; and in accordance with a determination that the convergence condition is not satisfied, selecting a candidate warp position between the first and second warp positions that is associated with a depth value closest to the viewpoint associated with the reference image frame as the first intermediate warp result for the respective pixel.

As one example, with reference to FIG. 17B, the process 1750 generates a first candidate warp result 922A and a second candidate warp result 932A associated with the first starting point for the respective pixel P(x,y) and selects an intermediate warp result 942A associated with the first starting point for the respective pixel P(x,y) based on the convergence test 940A, which is described in more detail with reference to FIG. 10. For example, the first candidate warp result 922A corresponds to a first warp position and an associated first depth value at t−1. For example, the second candidate warp result 932A corresponds to a second warp position and an associated second depth value at t. In some implementations, the device also adds a constant to the depth value associated with of the selected candidate warp result. One of ordinary skill in the art will appreciate how the process 1750 may be applied to the N candidate starting points with varying depths for the respective pixel P(x,y) to generate the plurality of intermediate warp results 942A, . . . , 942N.

In some implementations, with respect to the second warp type, the method 2000 includes: identifying a quad-group of pixels that includes the respective pixel within the target image frame; selecting a quad-group warp result from among the warp result for the respective pixel and warp results for other pixels in the quad-group of pixels that corresponds to a depth closest to the viewpoint associated with the reference image frame; and updating the pixel information for the respective pixel within the target image frame based on pixel information for a reference pixel within the reference image frame that corresponds to the quad-group warp result. For example, with reference to FIG. 19A the process 1900 determines a warp result for a quad-group of pixels that is closest to the viewpoint (e.g., a camera pose/position) associated with the reference image frame based on the per-pixel warp results (e.g., warp results 1755A, 1755B, 1755C, and 1755D in FIG. 19A) from the process 1750 in FIG. 17B.

In some implementations, with respect to the second warp type, the method 2000 includes, after selecting the quad-group warp result, upscaling the warp resolution associated with the quad-group warp result by performing an additional fixed-point iteration from a warp position associated with the quad-group warp result. For example, with reference to FIG. 19A the process 1900 (at block 1220) upscales the warp resolution associated with the warp result from block 1210 by performing an additional FPI operation with the warp result from block 1210 as a starting point.

As represented by block 20-6, the method 2000 includes, in accordance with a determination that the respective characterization vector for the respective neighborhood of pixels does not satisfy the foreground or background conditions, generating the warp result for the respective pixel based on a third warp type. In some implementations, the third warp type corresponds to a lower quality iterative warp, which is described in more detail with reference to FIG. 17C. According to some implementations, the warp result from the block 20-6 includes a warp position and an associated depth value.

In some implementations, the method 2000 includes: in accordance with the determination that the respective characterization vector for the respective neighborhood of pixels does not satisfy the foreground or background conditions: obtaining a plurality of starting points within the reference image frame based on the respective characterization vector for the respective neighborhood of pixels, wherein each of the plurality of starting points is associated with pixel coordinates within the reference image frame and a different depth value; and performing the lower quality iterative warp by: generating a plurality of intermediate warp results for the respective pixel based on the plurality of starting points within the reference image frame and the forward flow information, wherein each of the plurality of intermediate warp results is associated with a candidate warp position and an associated depth, and wherein each of the plurality of intermediate warp results is generated based on a different one of the plurality of starting points within the reference image frame; and selecting a warp result for the respective pixel from among the plurality of intermediate warp results, wherein the warp result corresponds to the candidate warp position associated with a depth closest to a viewpoint associated with the reference image frame. For example, FIG. 18 shows an example depth hierarchy 1800 for the N candidate starting points in accordance with some implementations. For example, with reference to FIG. 17C, the process 1770 generates intermediate warp results 942A, . . . , 942N for the respective pixel P(x,y) as a result of convergence tests 940A, . . . , 940N associated with each of the N candidate starting points with varying depths for the respective pixel P(x,y). For example, with further reference to FIG. 17C, the process 1770 generates a warp result 1775 for the respective pixel P(x,y) that includes a warp position and an associated depth value based on the lower quality iterative warp operation.

In some implementations, with respect to the third warp type, the method 2000 includes: for a respective starting point among the plurality of starting points: performing a fixed-point iteration from the respective starting point within the reference image frame in order to generate a first candidate warp position and a first depth value; performing another fixed-point iteration from the first candidate warp position within the reference image frame in order to generate a second candidate warp position and a second depth value; determining whether a convergence condition is satisfied based on the first and second depth values; in accordance with a determination that the convergence condition is satisfied, selecting the second candidate warp position as a first intermediate warp result for the respective pixel; and in accordance with a determination that the convergence condition is not satisfied, selecting a candidate warp position between the first and second warp positions that is associated with a depth value closest to the viewpoint associated with the reference image frame as the first intermediate warp result for the respective pixel.

As one example, with reference to FIG. 17C, the process 1770 generates a first candidate warp result 922A and a second candidate warp result 932A associated with the first starting point for the respective pixel P(x,y) and selects an intermediate warp result 942A associated with the first starting point for the respective pixel P(x,y) based on the convergence test 940A, which is described in more detail with reference to FIG. 10. For example, the first candidate warp result 922A corresponds to a first warp position and an associated first depth value at t−1. For example, the second candidate warp result 932A corresponds to a second warp position and an associated second depth value at t. In some implementations, the device also adds a constant to the depth value associated with of the selected candidate warp result. One of ordinary skill in the art will appreciate how the process 1770 may be applied to the N candidate starting points with varying depths for the respective pixel P(x,y) to generate the plurality of intermediate warp results 942A, . . . , 942N.

In some implementations, with respect to the third warp type, the method 2000 includes: identifying a quad-group of pixels that includes the respective pixel within the target image frame; selecting a quad-group warp result from among the warp result for the respective pixel and warp results for other pixels in the quad-group of pixels that corresponds to a depth closest to the viewpoint associated with the reference image frame; and updating the pixel information for the respective pixel within the target image frame based on pixel information for a reference pixel within the reference image frame that corresponds to the quad-group warp result. For example, with reference to FIG. 19B the process 1950 determines a warp result for a quad-group of pixels that is closest to the viewpoint (e.g., a camera pose/position) associated with the reference image frame based on the per-pixel warp results (e.g., warp results 1775A, 1775B, 1775C, and 1775D in FIG. 19B) from the process 1770 in FIG. 17C.

In some implementations, with respect to the third warp type, the method 2000 includes, after selecting the quad-group warp result, upscaling the warp resolution associated with the quad-group warp result by performing an additional fixed-point iteration from a warp position associated with the quad-group warp result. For example, with reference to FIG. 19B the process 1950 (at block 1220) upscales the warp resolution associated with the warp result from block 1210 by performing an additional FPI operation with the warp result from block 1210 as a starting point.

As represented by block 20-7, the method 2000 includes populating pixel information (e.g., RGB values) for the respective pixel within the target image frame based on pixel information for a reference pixel within the reference image frame that corresponds to the warp result. For example, the pixel information includes RGB values, depth information, etc. According to some implementations, the device or a component thereof (e.g., the pixel population engine 850 in FIGS. 2 and 8) looks up RGB values for a pixel within the reference image that corresponds to the warp result (e.g., the warp position within the warp result) and populates the respective pixel within the target image frame based on said RGB values. In some implementations, the method 2000 corresponds to inverse warping where the target image frame is populated on a pixel-by-pixel basis pixel by sampling the reference image frame and the associated forward flow information. As such, the target image frame is a warped version of the reference image frame.

Figure 21:
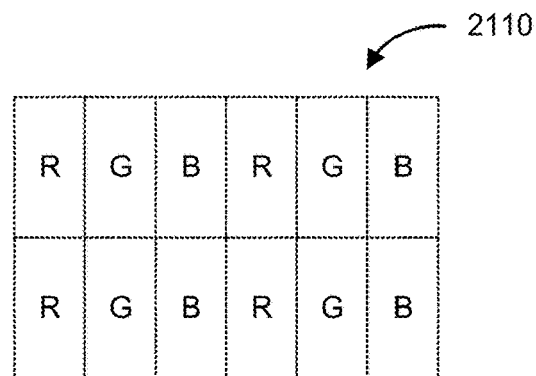
FIG. 21 illustrates block diagrams of various sub-pixel architectures in accordance with some implementations.
Figure 21:
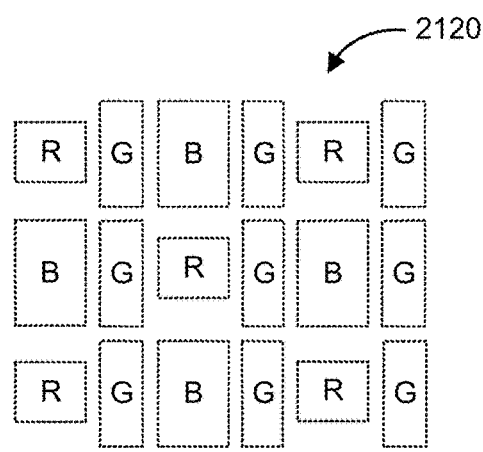
Figure 21:
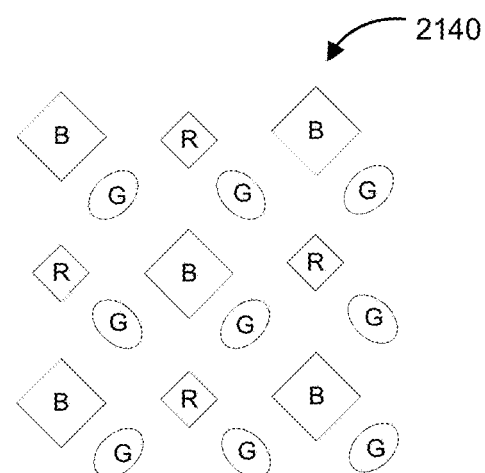

FIG. 21 illustrates block diagrams of various sub-pixel architectures 2110, 2120, and 2140 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, the sub-pixel architecture 2110 corresponds to a traditional RGB-RGB striped layout, the sub-pixel architecture 2120 corresponds to a PENTILE RG-BG striped layout, and the sub-pixel architecture 2140 corresponds to a PENTILE RG-BG diamond layout. One of ordinary skill in the art will appreciate that many other sub-pixel architectures may be implemented in various other implementations.

For example, the sub-pixel architectures 2120 and 2140 are associated with organic light-emitting diode (OLED) displays. According to some implementations, the sub-pixel architectures 2120 and 2140 include green sub-pixels interleaved with alternating red and blue sub-pixels. As such, for example, the green sub-pixels are mapped to input pixels on a one-to-one basis, whereas the red and blue sub-pixels are subsampled. Thus, continuing with this example, the sub-pixel architectures 2120 and 2140 (with the PENTILE RG-BG layouts) create a color display with fewer sub-pixels than the sub-pixel architecture 2110 with the traditional RGB-RGB layout but with the same measured luminance display resolution.

FIG. 22 is a flowchart representation of a process 2200 for performing dissimilar warp resolutions fast chromatic aberration correction (CAC) in accordance with some implementations. In various implementations, the process 2200 is performed by a device (e.g., the controller 110 in FIGS. 1A, 1B, and 2; the electronic device 120 in FIGS. 1A, 1B, and 3; or a suitable combination thereof) with one or more processors and non-transitory memory or a component thereof. In some implementations, the process 2200 is performed by processing logic, including hardware, firmware, software, or a combination thereof. In some implementations, the process 2200 is performed by a processor executing code stored in a non-transitory computer-readable medium (e.g., a memory). In various implementations, some operations in the process 2200 are, optionally, combined and/or the order of some operations is, optionally, changed.

As represented by block 2210, the process 2200 includes performing the statistically robust warping (SRW) algorithm or an adaptive statistically robust warping (ASRW) algorithm on the first channel 2202 (e.g., green channel/sub-pixel) of a respective pixel P(x,y) within a target image frame in order to generate a warp result 2212 for the first channel of the respective pixel P(x,y). According to some implementations, the SRW algorithm is described in detail above with reference to FIGS. 8-13. According to some implementations, the ASRW algorithm is described in detail above with reference to FIGS. 14-20. According to some implementations, the warp result 2212 for the first channel includes a warp position and an associated depth value. In some implementations, the process 2200 includes determining a warp result for the first channel among a quad-group of pixels that includes the respective pixel P(x,y) similar to the process 1200 described in FIG. 12.

As represented by block 2220, the process 2200 includes selecting one of the colors associated with the second and third channels 2204 (e.g., red and blue channels/sub-pixels). As one example, within a quad-group of pixels, the device may select the red channels/sub-pixels for the top pixels and the blue channels/sub-pixels for the bottom pixels (or vice versa). As another example, within a quad-group of pixels, the device may select the red channels/sub-pixels for the left pixels and the blue channels/sub-pixels for the right pixels (or vice versa). One of ordinary skill in the art will appreciate how this selection of sub-channels may change based on the sub-pixel layout or the like.

As represented by block 2230, the process 2200 includes performing M fixed-point iterations (FPIs) using the warp result 2212 as the starting point in order to generate a warp result 2232 for the second and third channels of the respective pixel P(x,y). In some implementations, M=1. In some implementations, M≥2. In some implementations, the process 2200 includes determining a warp result for the second and third channel among a quad-group of pixels that includes the respective pixel P(x,y) similar to the process 1200 described in FIG. 12.

As represented by block 2240, the process 2200 includes: (A) obtaining first sub-pixel information for the first channel of respective pixel P(x,y) by looking up sub-pixel information from the one or more reference images frames 2206 based on the warp position associated with the warp result 2212; and (B) obtaining second sub-pixel information for the second and third channels of respective pixel P(x,y) by looking up sub-pixel information from the one or more reference images frames 2206 based on the warp position associated with the warp result 2232.

As represented by block 2250, the process 2200 includes combining the first sub-pixel information and the second sub-pixel information obtained in block 2240 in order to obtain combined pixel information.

As represented by block 2260, the process 2200 includes populating the respective pixel P(x,y) within the target image frame based on the combined pixel information from block 2250.

Figure 23:
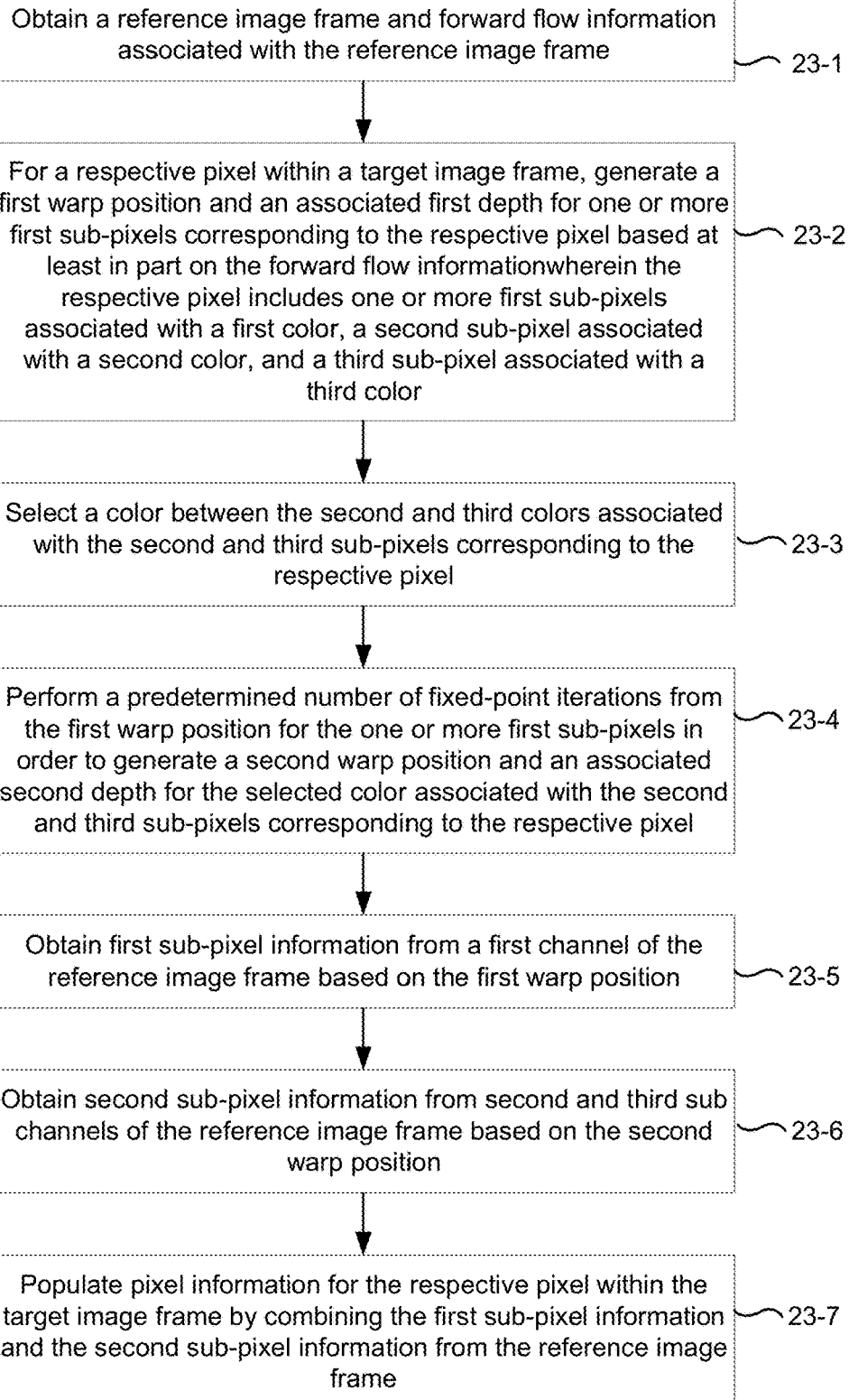
FIG. 23 is a flowchart representation of a method of performing dissimilar warp resolutions fast CAC in accordance with some implementations.

FIG. 23 is a flowchart representation of a method 2300 of performing dissimilar warp resolutions fast chromatic aberration correction (CAC) in accordance with some implementations. In various implementations, the method 2300 is performed by a device with one or more processors and non-transitory memory (e.g., the controller 110 in FIGS. 1A, 1B, and 2; the electronic device 120 in FIGS. 1A, 1B, and 3; or a suitable combination thereof) or a component thereof. In some implementations, the method 2300 is performed by processing logic, including hardware, firmware, software, or a combination thereof. In some implementations, the method 2300 is performed by a processor executing code stored in a non-transitory computer-readable medium (e.g., a memory). In various implementations, some operations in method 2300 are, optionally, combined and/or the order of some operations is, optionally, changed.

As described above, in computer graphics, significant coherence is exhibited across frames of an animation (temporal coherence) and across nearby views of a scene (spatial coherence). Current rendering pipelines recompute each frame, resulting in a large amount of repeated work. Current warping methods are able to synthesize a plausible target frame therebetween without performing the rasterization and shading, by reusing rendering results from neighboring frame(s). As one example, inverse iterative warping may be performed on a reference image to produce the target image. However, the final output of the inverse iterative warping operation is significantly impacted by a starting point chosen within the reference image similar to gradient descent.

In order to combat this problem, in some implementations, the methods described herein (e.g., the method 1300 associated with the SRW algorithm in FIG. 13 and the method 2000 associated with the ASRW algorithm in FIG. 20) perform multiple inverse warp operations from a plurality of starting points with varying depths for each pixel and chooses the best result from among the multiple inverse warp operations. However, in practice, the SRW or ASRW algorithms may be performed on each sub-pixel of an RGB display type in order to account for chromatic aberration that occurs therein.

For some PENTILE displays, each pixel includes two green sub-pixels, a single red sub-pixel, and a single blue sub-pixel (e.g., the sub-pixel architecture 2120 in FIG. 21), which increases the importance of the green sub-pixels. For some other PENTILE displays, each pixel includes a green sub-pixel and shares red and blue sub-pixels with a neighboring regions (e.g., the sub-pixel architecture 2140 in FIG. 21), which increases the importance of the green sub-pixels. Thus, according to some implementations, the method 2300 described herein performs the SRW or ASRW algorithm at full resolution on a first channel associated with one or more sub-pixels (e.g., green sub-pixels) and uses the warp result for the first channel as a starting point for a reduced resolution warping operation performed on the second and third channels associated with second and third sub-pixels (e.g., red and blue sub-pixels) in order to reduce resource consumption and converse time.

As represented by block 23-1, the method 2300 obtaining a reference image frame and forward flow information associated with the reference image frame. In some implementations, the device or a component thereof receives, retrieves, or generates the reference image frame. According to some implementations, the device or a component thereof (e.g., the rendering engine 252 in FIG. 2) renders the reference image based on a synthetic environment with one or more three-dimensional (3D) models. As such, in some implementations, the forward flow information corresponds to movement of the one or more 3D models within the synthetic environment across a plurality of image frames. In some implementations, the forward flow information corresponds to movement of the viewpoint of the synthetic environment across a plurality of image frames. According to some implementations, the device or a component thereof captures an image frame of physical environment captured with an associated image sensor, wherein the captured image frame corresponds to the reference image frame. As such, in some implementations, the forward flow information is based on movement information associated with a change of head pose, a change of gaze direction, a change of body pose, a change of camera pose, and/or the like. Thus, for example, the forward flow information is generated by the device or a component thereof (e.g., the forward flow generator 810 in FIGS. 2 and 8) based on head tracking information, eye tracking information, body pose tracking information, depth information, and/or the like.

As represented by block 23-2, the method 2300 includes, for a respective pixel within a target image frame, generating a first warp position and a first depth value for one or more first sub-pixels (e.g., green) corresponding to the respective pixel based at least in part on the forward flow information, wherein the respective pixel includes one or more first sub-pixels associated with a first color, a second sub-pixel associated with a second color, and a third sub-pixel associated with a third color. In some implementations, the method 2300 includes performing the SRW algorithm, as described in with reference to FIGS. 8-13, to generate a warp result for the one or more first sub-pixels of the respective pixel, wherein the warp result includes the first warp position and the associated first depth. In some implementations, the method 2300 includes performing the ASRW algorithm, as described in with reference to FIGS. 14-20, to generate a warp result for the one or more first sub-pixels of the respective pixel, wherein the warp result includes the first warp position and the associated first depth. According to some implementations, the one or more first sub-pixels correspond to one or more green sub-pixels.

As represented by block 23-3, the method 2300 includes selecting a color between the second and third colors (e.g., red and blue) associated with the second and third sub-pixels (e.g., red and blue sub-pixels) corresponding to the respective pixel. According to some implementations, the second and third sub-pixels correspond to red and blue sub-pixels. As one example, within a quad-group of pixels, the device may select the red channels/sub-pixels for the top pixels and the blue channels/sub-pixels for the bottom pixels (or vice versa). As another example, within a quad-group of pixels, the device may select the red channels/sub-pixels for the left pixels and the blue channels/sub-pixels for the right pixels (or vice versa). One of ordinary skill in the art will appreciate how this selection of sub-channels may change based on the sub-pixel layout or the like.

As represented by block 23-4, the method 2300 includes performing a predetermined number of fixed-point iterations from the first warp position for the one or more first sub-pixels in order to generate a second warp position and a second depth value for the selected color associated with the second and third sub-pixels corresponding to the respective pixel. In some implementations, the predetermined number of fixed-point iterations corresponds to a single fixed-point iteration. In some implementations, the predetermined number of fixed-point iterations corresponds to two or more fixed-point iterations. In some implementations, separate warp positions and depth values may be generated for the second and/or third sub-pixels using the first warp position for the first sub-pixel as the starting point. As one example, assuming the display corresponds to the sub-pixel architecture 2140 in FIG. 21 and the respective pixel corresponds to an RG pixel type, the device performs the FPI operation for the red channel using the first warp position for the green channel as a starting point to generate the second warp position for the red channel and (optionally) uses the warp position from a neighboring pixel for the green channel.

In some implementations, the method 2300 includes: identifying a quad-group of pixels that includes the respective pixel within the target image frame; selecting a quad-group warp result from among the second warp position for the second and third sub-pixels corresponding to the respective pixel and warp positions for the second and third sub-pixels for other pixels in the quad-group of pixels that corresponds to a depth closest to the viewpoint associated with the reference image frame; and updating the second sub-pixel information for the second and third sub-pixels of the reference image frame based on the quad-group warp result. For example, with reference to FIG. 12 the process 1200 determines a warp result for a quad-group of pixels based on the per-pixel warp results (e.g., the warp results 952A, 952B, 952C, and 952D in FIG. 12) that is closest to a viewpoint (e.g., a camera pose/position) associated with the reference image frame.

In some implementations, the method 2300 includes, after selecting the quad-group warp result, upscaling the warp resolution associated with the quad-group warp result by performing an additional fixed-point iteration from a warp position associated with the quad-group warp result. For example, with reference to FIG. 12 the process 1200 (at block 1220) upscales the warp resolution associated with the warp result from block 1210 by performing an additional FPI operation with the warp result from block 1210 as a starting point.

As represented by block 23-5, the method 2300 includes obtaining first sub-pixel information from a first channel of the reference image frame based on the first warp position. According to some implementations, the device or a component thereof (e.g., the pixel population engine 850 in FIGS. 2 and 8) looks up sub-pixel values for a sub-pixel associated with the first channel within the reference image that corresponds to the first warp position. As one example, assuming the display corresponds to the sub-pixel architecture 2140 in FIG. 21 and the respective pixel corresponds to an RG pixel type, the device looks up sub-pixel information for the green channel based on the first warp position determined in step 23-2.

As represented by block 23-6, the method 2300 includes obtaining second sub-pixel information from second and/or third channels of the reference image frame based on the second warp position. According to some implementations, the device or a component thereof (e.g., the pixel population engine 850 in FIGS. 2 and 8) looks up sub-pixel values for sub-pixels associated with the second and third channels within the reference image that corresponds to the second warp position. As one example, assuming the display corresponds to the sub-pixel architecture 2140 in FIG. 21 and the respective pixel corresponds to an RG pixel type, the device looks up sub-pixel information for the red channel based on the second warp position determined in step 23-4 and (optional) looks up sub-pixel information for the blue channel based on a warp position determined for a neighboring BG pixel type.

As represented by block 23-7, the method 2300 includes populating pixel information for the respective pixel within the target image frame by combining the first sub-pixel information and the second sub-pixel information from the reference image frame. For example, the pixel information includes RGB values, depth information, etc. In some implementations, the method 2300 corresponds to inverse warping where the target image frame is populated on a pixel-by-pixel basis pixel by sampling the reference image frame and the associated forward flow information. As such, the target image frame is a warped version of the reference image frame.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including non-transitory memory and one or more processors coupled with the non-transitory memory:
   obtaining a reference image frame and forward flow information associated with the reference image frame;
   obtaining a plurality of characterization vectors for each of a plurality of neighborhoods of pixels in the reference image frame, wherein each characterization vector at least includes a foreground depth value and a background depth value;
   for a respective pixel within a target image frame:
   identifying a respective neighborhood of pixels within the reference image frame that corresponds to the respective pixel within the target image frame based on the forward flow information;
   in accordance with a determination that a respective characterization vector for the respective neighborhood of pixels satisfies a background condition, generating a warp result for the respective pixel based on a first warp type, wherein the warp result includes a warp position and an associated depth value;
   in accordance with a determination that the respective characterization vector for the respective neighborhood of pixels satisfies a foreground condition, generating the warp result for the respective pixel based on a second warp type, wherein the second warp type corresponds to a first iterative warp operation; and
   in accordance with a determination that the respective characterization vector for the respective neighborhood of pixels does not satisfy the foreground or background conditions, generating the warp result for the respective pixel based on a third warp type, wherein the third warp type corresponds to a second iterative warp operation; and
   populating pixel information for the respective pixel within the target image frame based on pixel information for a reference pixel within the reference image frame that corresponds to the warp result.

2. The method of claim 1, wherein the foreground condition is satisfied when the foreground and background depth values for the respective neighborhood of pixels are at least a predetermined distance apart and the foreground depth value satisfies a nearness threshold value.

3. The method of claim 1, wherein the background condition is satisfied when the foreground and background depth values for the respective neighborhood of pixels are substantially similar and satisfy a farness threshold value.

4. The method of claim 1, wherein the first warp type corresponds to a planar warp operation.

5. The method of claim 1, wherein the second warp type corresponds to a higher quality iterative warp operation.

6. The method of claim 1, further comprising:
in accordance with the determination that the respective characterization vector for the respective neighborhood of pixels satisfies the foreground condition:
obtaining a plurality of starting points within the reference image frame based on the respective characterization vector for the respective neighborhood of pixels, wherein each of the plurality of starting points is associated with pixel coordinates within the reference image frame and a different depth value; and
performing the higher quality iterative warp by:
generating a plurality of intermediate warp results for the respective pixel based on the plurality of starting points within the reference image frame and the forward flow information, wherein each of the plurality of intermediate warp results is associated with a candidate warp position and an associated depth, and wherein each of the plurality of intermediate warp results is generated based on a different one of the plurality of starting points within the reference image frame; and
selecting a warp result for the respective pixel from among the plurality of intermediate warp results, wherein the warp result corresponds to the candidate warp position associated with a depth closest to a viewpoint associated with the reference image frame.

7. The method of claim 6, further comprising:
for a respective starting point among the plurality of starting points:
performing two or more fixed-point iterations from the respective starting point within the reference image frame in order to generate a first candidate warp position and a first depth value;
performing another fixed-point iteration from the first candidate warp position within the reference image frame in order to generate a second candidate warp position and a second depth value;
determining whether a convergence condition is satisfied based on the first and second depth values;
in accordance with a determination that the convergence condition is satisfied, selecting the second candidate warp position as a first intermediate warp result for the respective pixel; and
in accordance with a determination that the convergence condition is not satisfied, selecting a candidate warp position between the first and second warp positions that is associated with a depth value closest to the viewpoint associated with the reference image frame as the first intermediate warp result for the respective pixel.

8. The method of claim 1, wherein the third warp type corresponds to a lower quality iterative warp operation.

9. The method of claim 1, further comprising:
in accordance with the determination that the respective characterization vector for the respective neighborhood of pixels does not satisfy the foreground or background conditions:
obtaining a plurality of starting points within the reference image frame based on the respective characterization vector for the respective neighborhood of pixels, wherein each of the plurality of starting points is associated with pixel coordinates within the reference image frame and a different depth value; and
performing the lower quality iterative warp by:
generating a plurality of intermediate warp results for the respective pixel based on the plurality of starting points within the reference image frame and the forward flow information, wherein each of the plurality of intermediate warp results is associated with a candidate warp position and an associated depth, and wherein each of the plurality of intermediate warp results is generated based on a different one of the plurality of starting points within the reference image frame; and
selecting a warp result for the respective pixel from among the plurality of intermediate warp results, wherein the warp result corresponds to the candidate warp position associated with a depth closest to the viewpoint associated with the reference image frame.

10. The method of claim 9, further comprising:
for a respective starting point among the plurality of starting points:
performing a fixed-point iteration from the respective starting point within the reference image frame in order to generate a first candidate warp position and a first depth value;
performing another fixed-point iteration from the first candidate warp position within the reference image frame in order to generate a second candidate warp position and a second depth value;
determining whether a convergence condition is satisfied based on the first and second depth values;
in accordance with a determination that the convergence condition is satisfied, selecting the second candidate warp position as a first intermediate warp result for the respective pixel; and
in accordance with a determination that the convergence condition is not satisfied, selecting a candidate warp position between the first and second warp positions that is associated with a smallest depth value as the first intermediate warp result for the respective pixel.

11. The method of claim 1, further comprising:
identifying a quad-group of pixels that includes the respective pixel within the target image frame;
selecting a quad-group warp result from among the warp result for the respective pixel and warp results for other pixels in the quad-group of pixels that corresponds to a depth closest to the viewpoint associated with the reference image frame; and
updating the pixel information for the respective pixel within the target image frame based on pixel information for a reference pixel within the reference image frame that corresponds to the quad-group warp result.

12. The method of claim 11, further comprising;
after selecting the quad-group warp result, upscaling a warp resolution associated with the quad-group warp result by performing an additional fixed-point iteration from a warp position associated with the quad-group warp result.

13. The method of claim 1, wherein the reference image frame corresponds to an image frame rendered based on a synthetic environment with one or more three-dimensional (3D) models.

14. The method of claim 13, wherein the forward flow information corresponds to movement of the one or more 3D models within the synthetic environment across a plurality of rendered image frames.

15. The method of claim 13, wherein the forward flow information corresponds to movement of the viewpoint of the synthetic environment across a plurality of rendered image frames.

16. The method of claim 1, wherein the reference image frame corresponds to an image frame of a physical environment captured by an image sensor of the device.

17. The method of claim 16, wherein the forward flow information is based on movement information associated with at least one of a change of head pose, a change of gaze direction, a change of body pose, or a change of pose of the image sensor.

18. A device comprising:
one or more processors;
a non-transitory memory; and
one or more programs stored in the non-transitory memory, which, when executed by the one or more processors, cause the device to:
obtain a reference image frame and forward flow information associated with the reference image frame;
obtain a plurality of characterization vectors for each of a plurality of neighborhoods of pixels in the reference image frame, wherein each characterization vector at least includes a foreground depth value and a background depth value;
for a respective pixel within a target image frame:
identify a respective neighborhood of pixels within the reference image frame that corresponds to the respective pixel within the target image frame based on the forward flow information;
in accordance with a determination that a respective characterization vector for the respective neighborhood of pixels satisfies a background condition, generate a warp result for the respective pixel based on a first warp type, wherein the warp result includes a warp position and an associated depth value;
in accordance with a determination that the respective characterization vector for the respective neighborhood of pixels satisfies a foreground condition, generate the warp result for the respective pixel based on a second warp type, wherein the second warp type corresponds to a first iterative warp operation; and
in accordance with a determination that the respective characterization vector for the respective neighborhood of pixels does not satisfy the foreground or background conditions, generate the warp result for the respective pixel based on a third warp type, wherein the third warp type corresponds to a second iterative warp operation; and
populate pixel information for the respective pixel within the target image frame based on pixel information for a reference pixel within the reference image frame that corresponds to the warp result.

19. The device of claim 18, wherein the foreground condition is satisfied when the foreground and background depth values for the respective neighborhood of pixels are at least a predetermined distance apart and the foreground depth value satisfies a nearness threshold value.

20. A non-transitory memory storing one or more programs, which, when executed by one or more processors of a device, cause the device to:
obtain a reference image frame and forward flow information associated with the reference image frame;
obtain a plurality of characterization vectors for each of a plurality of neighborhoods of pixels in the reference image frame, wherein each characterization vector at least includes a foreground depth value and a background depth value;
for a respective pixel within a target image frame:
identify a respective neighborhood of pixels within the reference image frame that corresponds to the respective pixel within the target image frame based on the forward flow information;
in accordance with a determination that a respective characterization vector for the respective neighborhood of pixels satisfies a background condition, generate a warp result for the respective pixel based on a first warp type, wherein the warp result includes a warp position and an associated depth value;
in accordance with a determination that the respective characterization vector for the respective neighborhood of pixels satisfies a foreground condition, generate the warp result for the respective pixel based on a second warp type, wherein the second warp type corresponds to a first iterative warp operation; and
in accordance with a determination that the respective characterization vector for the respective neighborhood of pixels does not satisfy the foreground or background conditions, generate the warp result for the respective pixel based on a third warp type, wherein the third warp type corresponds to a second iterative warp operation; and
populate pixel information for the respective pixel within the target image frame based on pixel information for a reference pixel within the reference image frame that corresponds to the warp result.

* * * * *